Feb. 7, 1961

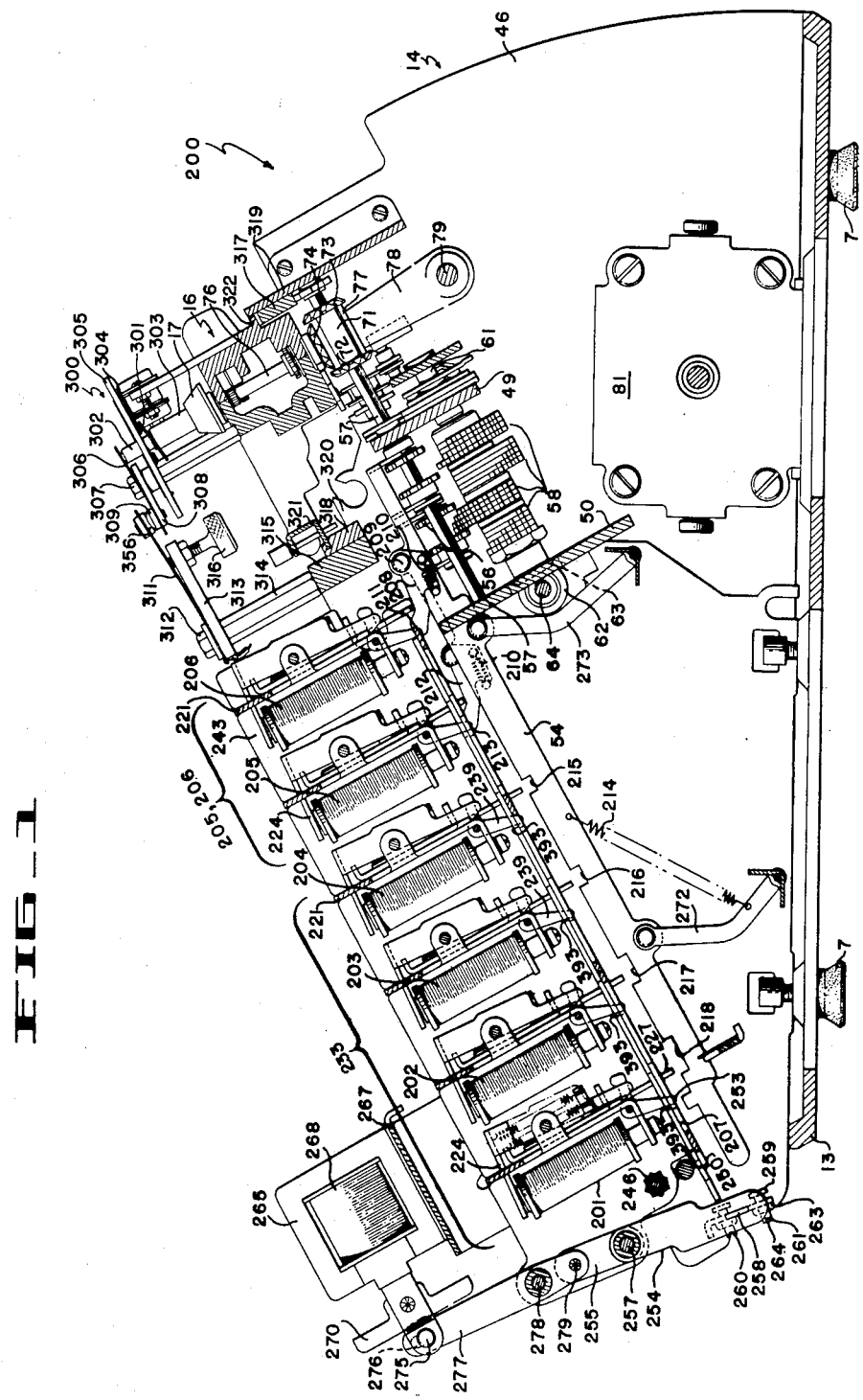

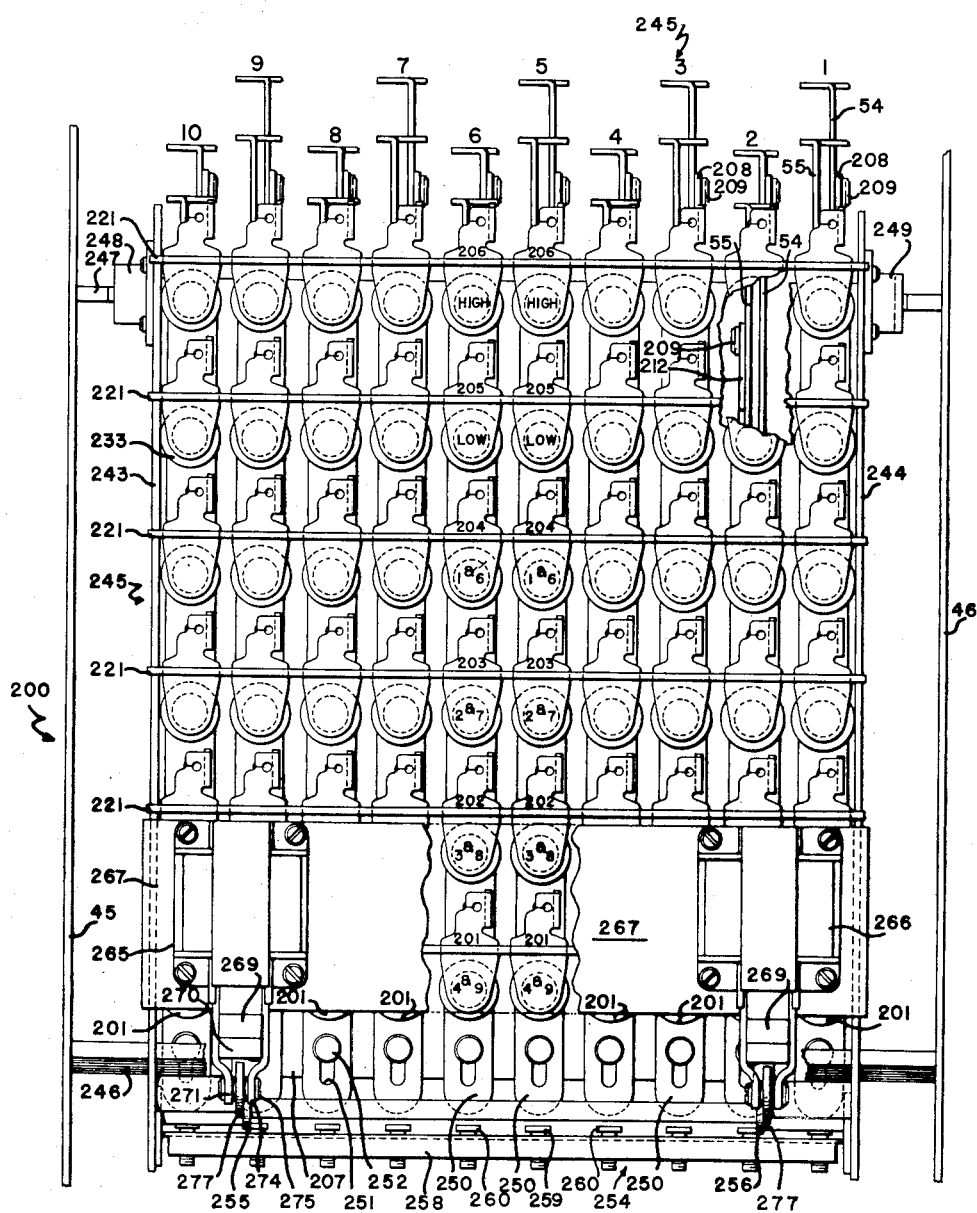

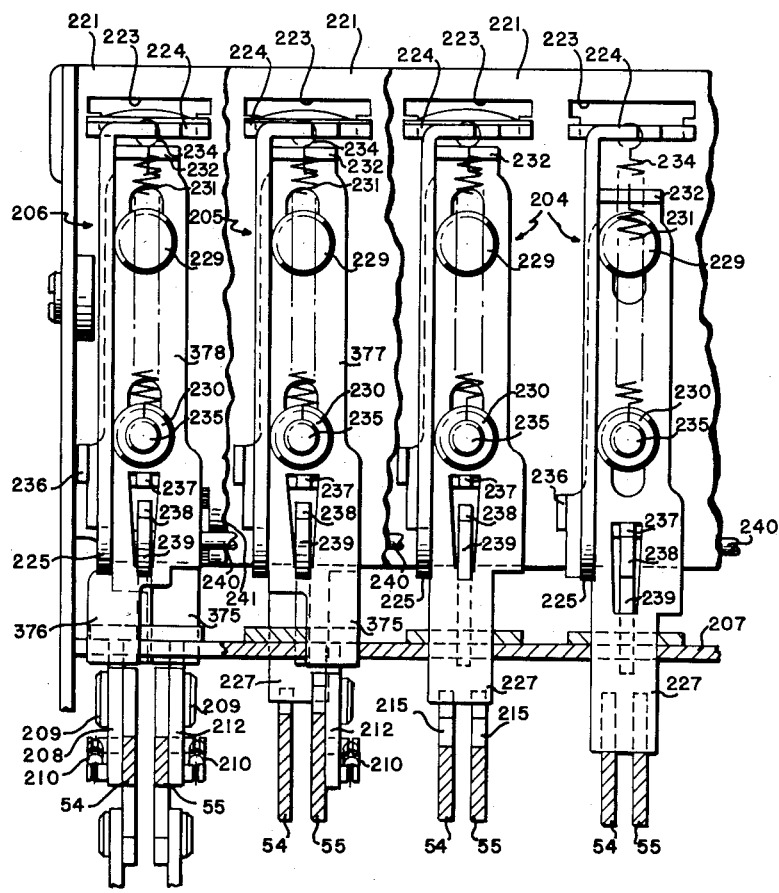
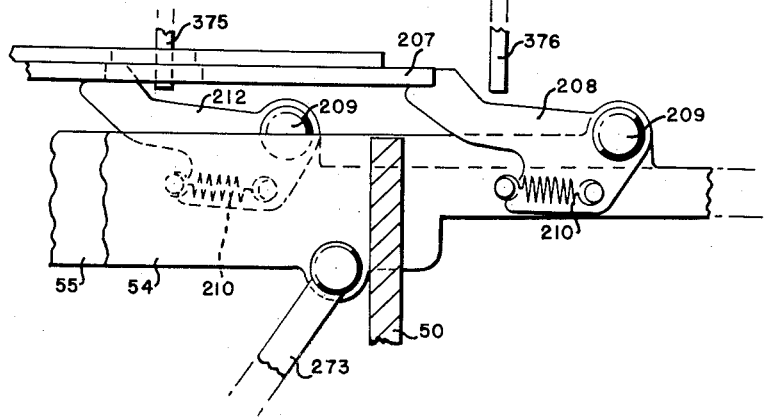

G. J. SPESOCK ET AL 2,970,756

ELECTRO-MAGNETIC SELECTING APPARATUS

Filed Feb. 23, 1954

FIG_4

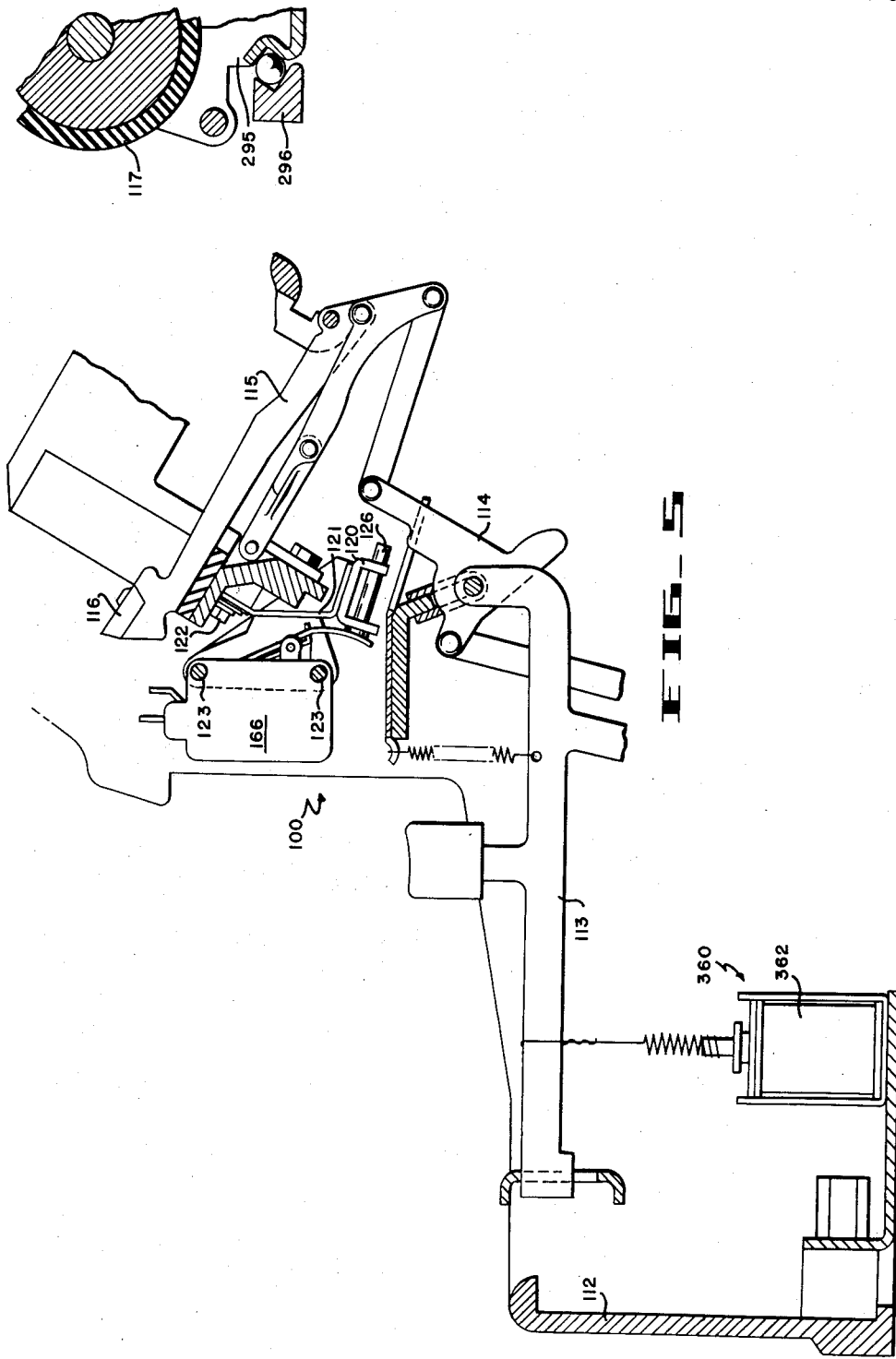

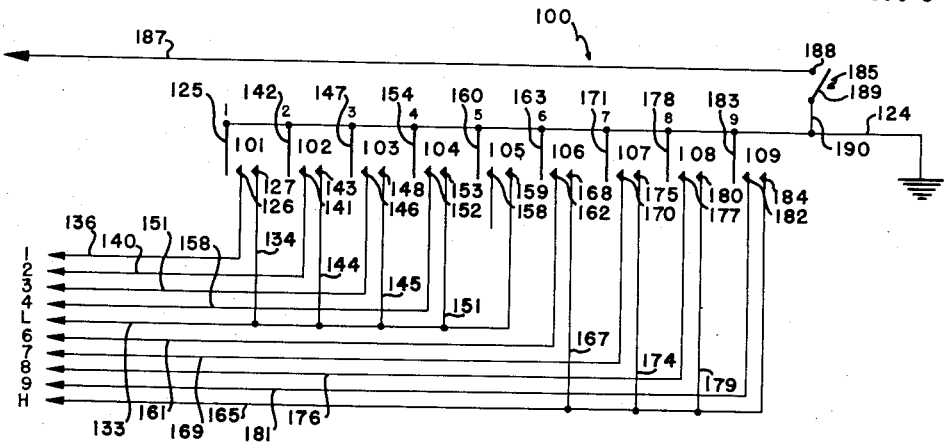
FIG_6
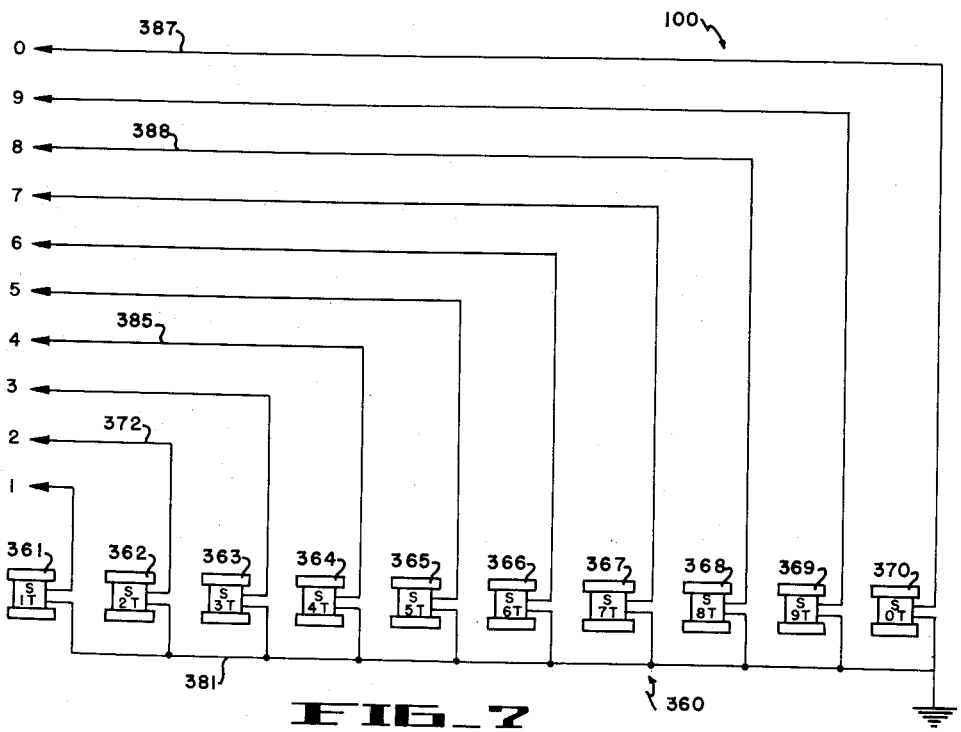
FIG_7

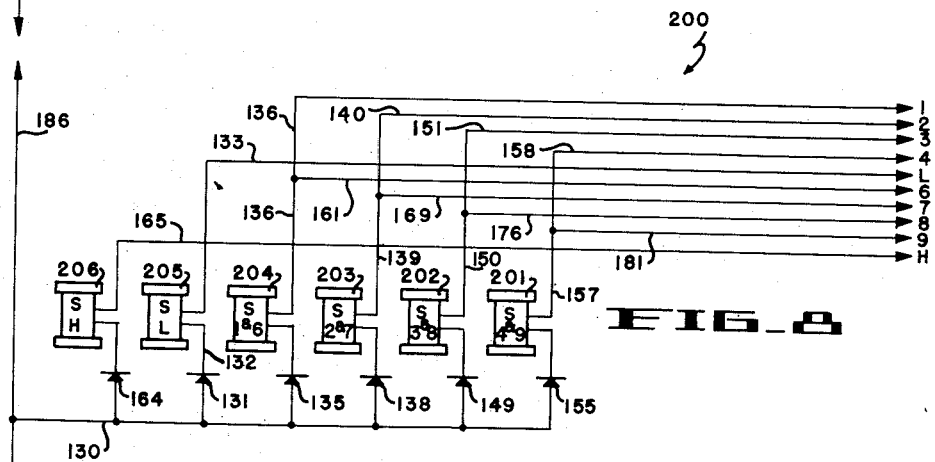
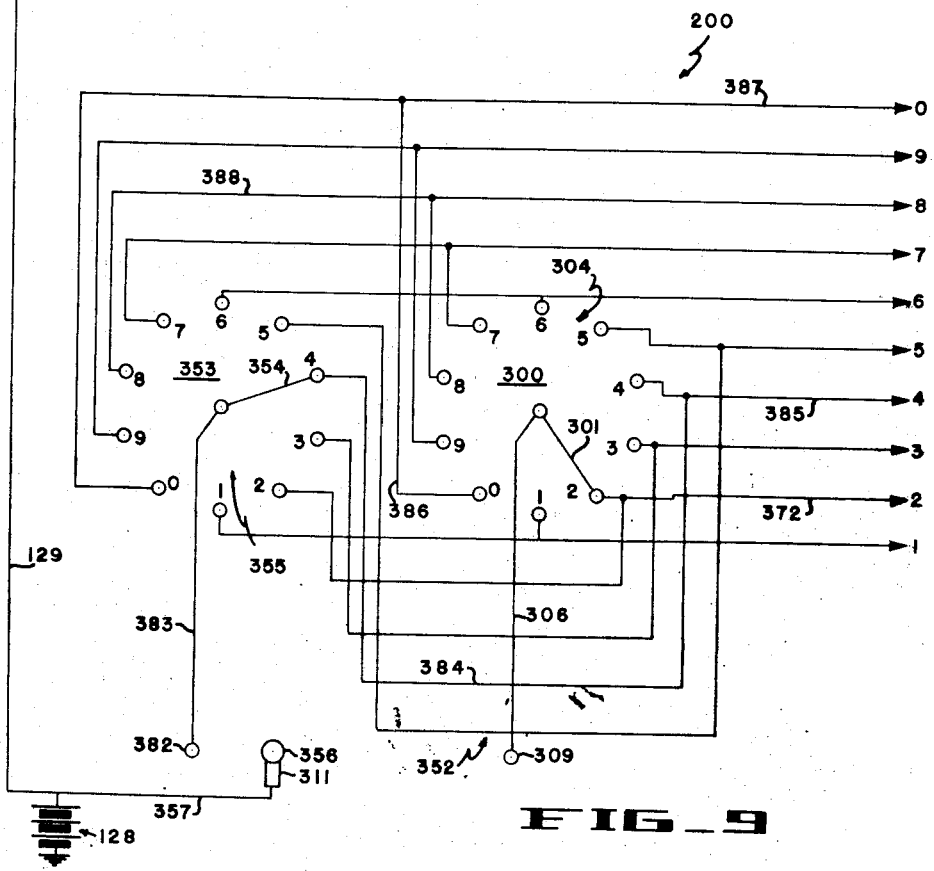

Feb. 7, 1961 G. J. SPESOCK ET AL 2,970,756
ELECTRO-MAGNETIC SELECTING APPARATUS
Filed Feb. 23, 1954 10 Sheets-Sheet 8
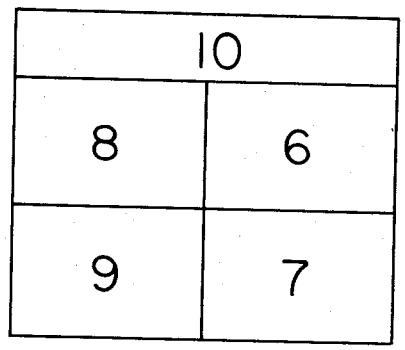
FIG_11
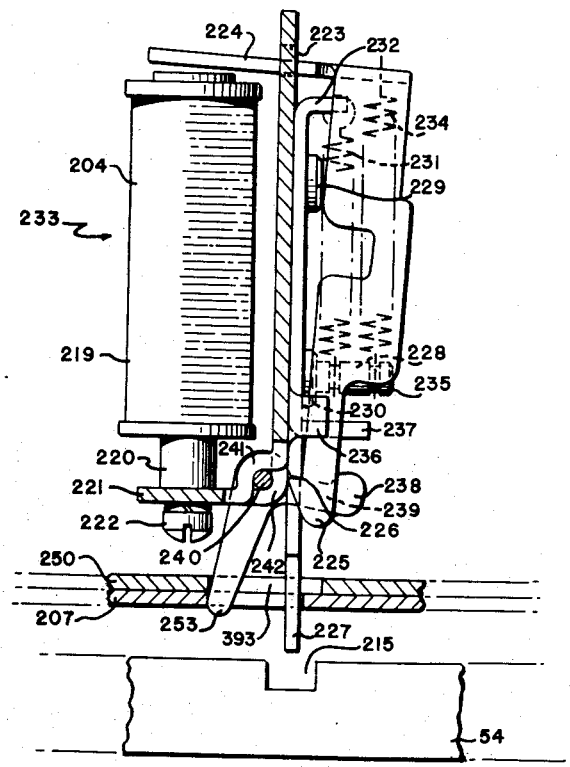
FIG_14

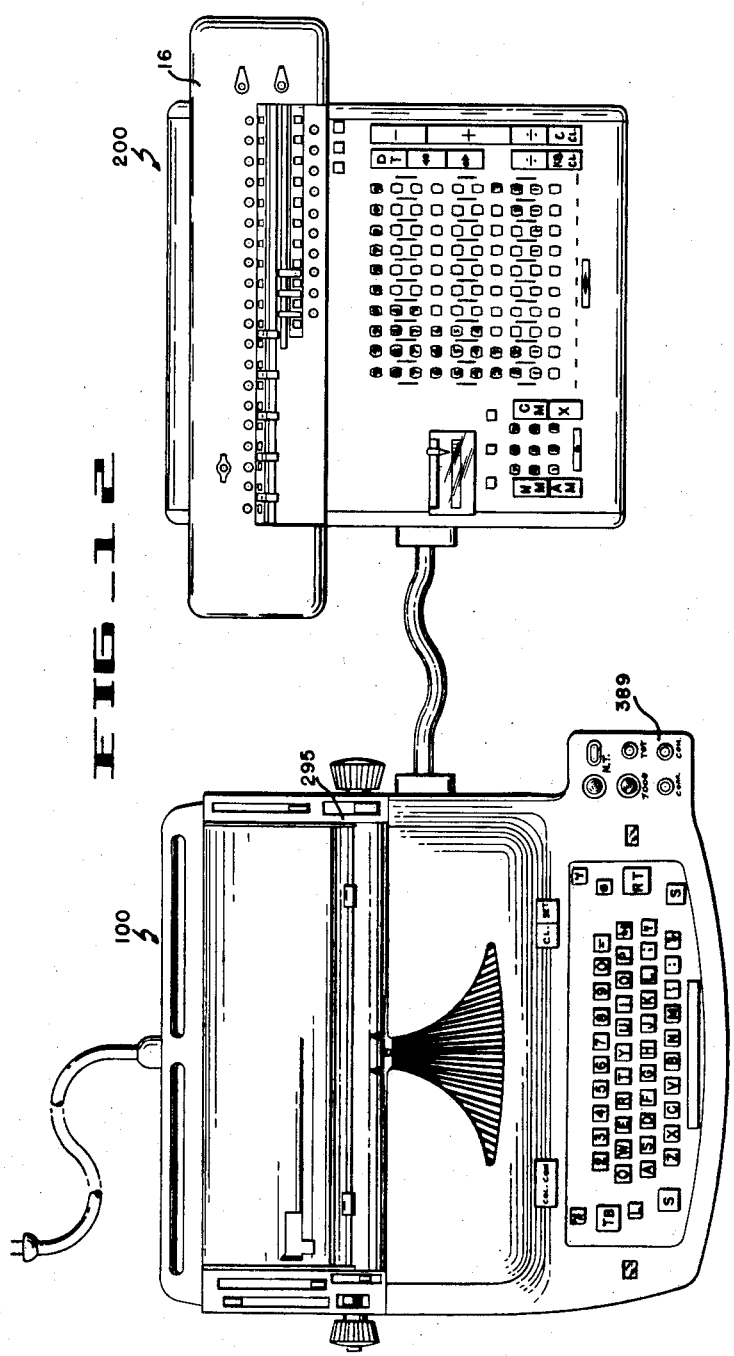

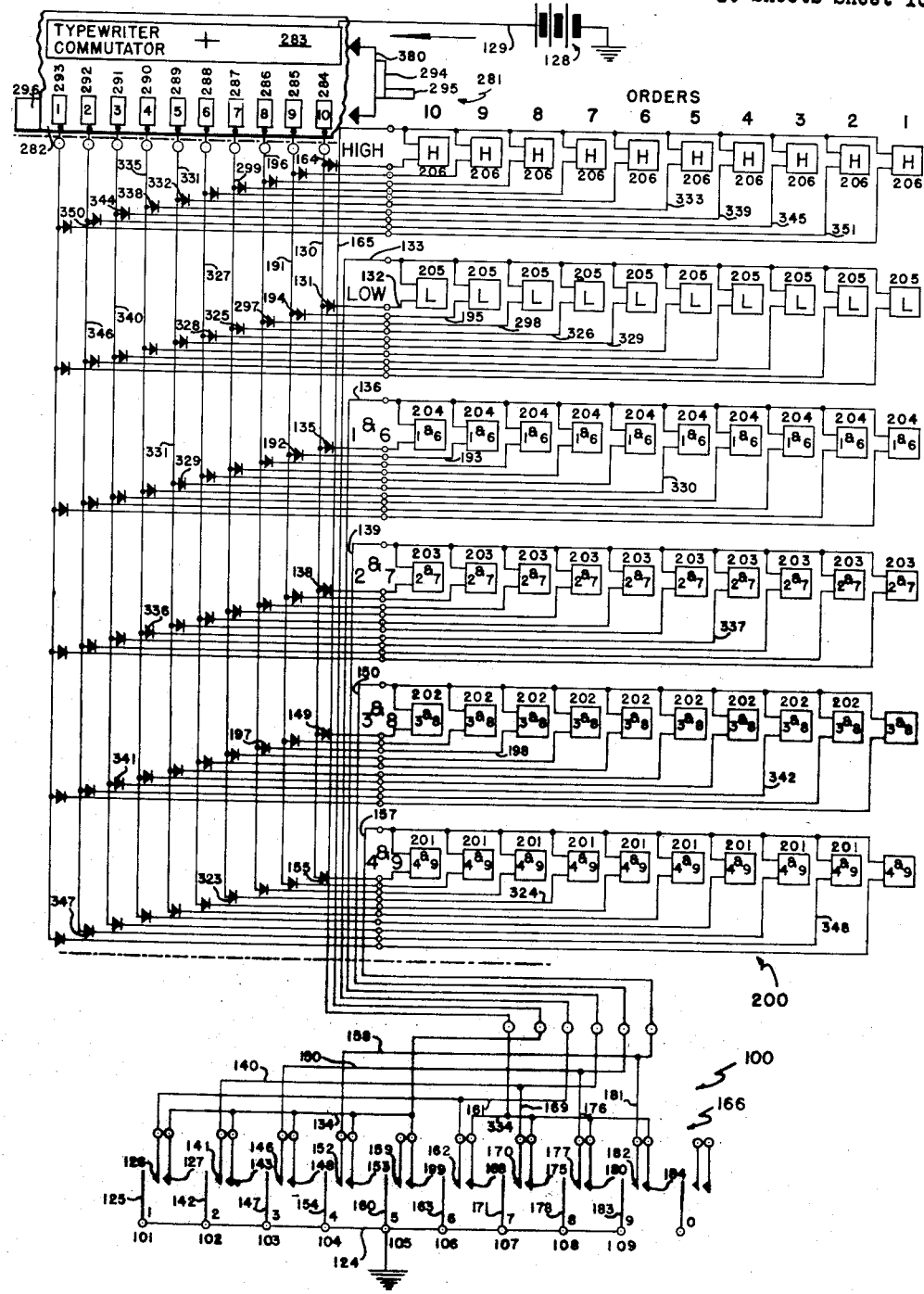
FIG_13

United States Patent Office 2,970,756
Patented Feb. 7, 1961

2,970,756

ELECTRO-MAGNETIC SELECTING APPARATUS

Gilbert J. Spesock, San Lorenzo, and Donald L. Rolph and Charles S. Balaz, Hayward, Calif., assignors to Friden, Inc., a corporation of California Filed Feb. 23, 1954, Ser. No. 412,042

12 Claims. (Cl. 235—60.12)

This invention relates to selecting apparatus and more particularly to selecting apparatus operable to selectively control the application of a power transmitting member to a registering member.

The invention is applicable, but not limited, to calculating machines in which selecting slides are provided to selectively control the application of power from rotating members to gear wheels in a registering mechanism.

The selecting apparatus is suitable for use in connection with a calculating machine operable to be controlled by a typewriting machine through an electrical system.

The object of the invention is to provide an improved selecting apparatus suitable for use in controlling the operation of selecting slides.

A feature of the invention resides in an electromagnetically controlled bolt member in combination with a selecting slide, the bolt member serving as a stop and providing a means to control the extent of movement of the selecting slide.

Another feature resides in the release latch means provided for controlling the release of a selecting slide.

Another feature resides in the selecting slide operable to bring a gear wheel in the calculator into engagement with an actuating cylinder, the gear wheel when rotated operating to cause the operation of a registering mechanism.

In the drawings:

Fig. 1 is a side view, partly in section, of an improved calculating machine including the invention.

Fig. 2 is a top plan view of the calculating machine shown in Fig. 1.

Fig. 3 is a rear view, partly in section, of part of the selecting means provided by this invention and comprising the bolt members for selectively controlling the extent of movement in one direction of the selecting slides of the calculating machine.

Fig. 3A is a side view of a portion of the selecting means shown in Fig. 3 and taken from the left of that figure.

Fig. 4 is a side view, partly in section, of the carriage portion and supporting means therefor of a modified calculator including the registering means and electrical switch means associated therewith.

Fig. 5 is a side view, partly in section, of portions of an electrically operated typewriter.

Fig. 6 is a schematic wiring diagram of switches provided in the typewriter for remotely controlling electromagnetic stop devices in the calculator.

Fig. 7 is a schematic wiring diagram of solenoids provided in the typewriter permitting operation of the typewriter from a remotely located apparatus such, for example, as the calculator.

Fig. 8 is a schematic wiring diagram of the electromagnetic stop devices provided in the calculator and operable to take care of the selecting slides provided in one order column position of the calculator.

Fig. 9 is a schematic wiring diagram of two rotary type switches provided in the calculator and operable in accordance with the registrations of registering wheels in the calculator.

Fig. 10 is a schematic wiring diagram of the restoring solenoids provided in the calculator.

Fig. 11 shows the order in which Figs. 6, 7, 8, 9 and 10 should be relatively arranged to cooperatively form a schematic wiring diagram in which the circuit connections can be followed between the electrical elements in the typewriter and associated electrical elements in the calculator.

Fig. 12 shows a typewriter and a calculator connected by an electrical system and suitably arranged for practice of the invention.

Fig. 13 is a wiring diagram showing the switches in the typewriter and electromagnet devices in the calculator and providing for the control of the multiplicity of orders in the calculator and by operation of the switches in the typewriter, and Fig. 14 is an enlarged side view, partly in section of one of the electromagnetic bolt members shown in Fig. 3.

In calculating machines of the Thomas type and of the preferred form thereof shown in C. M. Friden et al., Patents No. 2,399,917 and No. 2,403,273, issued May 7, 1946, and July 2, 1946, respectively, and assigned to the same assignee as the present application, selecting slides identified as 54 and 68 in the respective patents are provided and the function of the selecting slides 54 is to selectively bring into engagement with sets of teeth on an actuating cylinder 58, the associated gear wheel of sets of gears 56. The selecting slides 54 shown in Patent No. 2,399,917 are selectively operable by means of manually operable keys 22. In the present invention the selecting slides are not manually operated but are controlled by means of electromagnetic devices some of which function as stop members for the selecting slides.

In the present invention and as shown in Fig. 1 the selecting slides 54 are normally held in an elevated position against the action of a spring and are selectively released for movement by operation of electromagnetic devices. The extent of movement under spring action permitted the selecting slides, is selectively controlled by means of bolts serving as stop bars and controlled in their operation by means of electromagnetic devices controlled from a remote station. Edge portions of the selecting slides are provided with notches of different widths, each width representing a digit of predetermined value. The extent of downward movement of the selecting slide is determined by the width of the notch into which the bolt of a stop member projects, the stop members being arranged for selective operation in accordance with required predetermined digits to be entered into the calculating machine. Two selecting slides are provided for each series of digits from "1" to "9," inclusive, one of the selecting slides taking care of the lower order digits from "1" to "5," inclusive, and the other selecting slide taking care of the higher order digits from "6" to "9," inclusive. Each notch in the selecting slide represents a low order and a high order digit of predetermined value. For example, the notches in one of the selecting slides would represent values as follows: The lowermost notch a value of "4" and "9," the next notch, above, in succession, the values of "3" and "8," the third notch the values "2" and "7," and the fourth notch the values "1" and "6." The value of "5" is obtained without the use of a notch representative thereof in the selecting slide which when released for movement for the value of "5" moves to its full traverse, the extent of which may be controlled by means of a fixed stop, not shown, or by suitable adjustment of an adjustment screw 259 in a bail 254.

Selecting and actuating mechanisms

Within case 14 Figs. 1 and 2 the frame includes left and right side plates 45 and 46 which are suitably mounted on base 13, and are interconnected by various cross-frame members including one or more tie rods not shown, and transverse plates 49 and 50 for supporting various mechanisms including the selecting and actuating mechanisms.

The values to be introduced into accumulator numeral wheels 17 are selected by means of a plurality of similar orders of selecting mechanisms comprising selecting slides and electromagnetically operated members to control the operation of the selecting slides. For this purpose each bank or order of digits is represented by a pair of selecting slides 54 and 55 as shown in Fig. 2. The selecting slides 54 and 55 when suitably operated will provide for entering into the calculator a value of digits from "1" to "9" as required. The selecting slide 55 is operable to take care of the entering of digits of a relatively low order from "1" to "5," and the selecting slide 54 is operable to enter into the calculator digits of a value of a relatively high order from "6" to "9," inclusive. When the selecting slide 54 is moved downwardly from the position shown in Fig. 1, it operates to move a gear wheel 56 into engagement with an actuating cylinder 58 which is motor driven from an electric motor 81 by way of a transverse shaft and bevel gear 62 which is in gear connection with a gear 63 on a shaft 61 on which are mounted the actuating cylinders 58. Each selecting slide 54 is connected at its rear end with a 10-tooth gear 56 slidably and nonrotatably mounted on longitudinal square shaft 57 whereby movement of selecting slide 54 serves to position the associated gear 56 on shaft 57 with respect to stepped teeth on the actuating cylinder 58 in accordance with the value of the digit required to be entered into the calculator. A pair of actuating cylinders 58 for adjacent orders of the machine are mounted on each longitudinal actuating shaft 61 which is suitably journalled in cross plates 49 and 50 and has a bevel gear connection 62 with transverse shaft 64. Shaft 64 is operable cyclically in a single direction from clutch controlled driving means provided in the calculator and is the only path of power flow from the motor 81.

As seen in Fig. 1, the pair of square shafts 57 associated with each actuating shaft 61 are positioned above and to either side thereof, while the sets of gears 56 on respective square shafts 57 are offset and movable longitudinally of the machine for cooperation with the similarly offset actuating cylinders 58. By the above arrangement and upon each rotation of the actuating means a selected number of increments of movement can be imparted to each shaft 57 by the associated actuating cylinder 58 in accordance with the adjusted position of gears 56.

Each shaft 57 (Figs. 1) is suitably journalled in cross plates 49 and 50, and has associated therewith selectively settable plus-minus gears 72 and 73, respectively, for driving a shaft 76 on which is mounted a numeral wheel 17. The plus-minus gears of each order of the machine include a spool 71 slidably and nonrotatably mounted on shaft 57 and having opposed 10-tooth bevel gears 72 and 73 arranged for selective engagement with gear 74 on numeral wheel shaft 76. The engagement of gears 72 and 73 with gear 74 is controlled by strap 77 which extends transversely of the machine between each set of plus-minus gears 72, 73 and is mounted by similar spaced arms 78 on transverse shaft 79, which is suitably journalled in side plates 45 and 46. Shaft 79 is controlled in a manner hereinafter described, to determine positive registration by meshing gears 72 with gears 74 and negative registration by meshing gears 73 with gears 74. In the neutral position shown in Fig. 1, in which gears 72 and 73 may be held normally by suitable spring-urged centralizing means associated with strap 77, carriage shifting can be effected.

During both additive and subtractive registration of values in numeral wheels 17, suitable transfer mechanism of conventional construction may be operative to effect a tens-transfer as disclosed, for example, in said patents.

It will be understood that there are plus and minus keys provided in the calculating machine for controlling the operation of the machine in addition and subtraction operations, and that the amounts required for entry into the machine or accumulation therein, are registered by the indicating wheels 17.

It will also be appreciated that in the calculating machine of the type shown there are means provided for shifting the carriage mechanism 16, and that such parts are operated in their normal manner and for the usual purpose. These operations and controls are so well known in the art that it is not necessary to describe them in the present application.

The present invention provides a means for controlling the operation of the selecting slides 54 and 55 in the calculator.

The selecting slides 54 and 55 are arranged in pairs as shown in Fig. 2, the number of pairs usually being sufficient for ten orders of digits to be entered in the calculating machine 200. The first order position 1, is indicated at the right and the orders progress therefrom toward the left. In each order and operable to take the place of the usually manually operable keys found in calculators, are electromagnetic devices 201 to 206, inclusive, which, as shown in Fig. 1, are constructed and arranged to be operable to selectively control the operation of the selecting slides 54 and 55.

The electromagnetic devices 201 to 204, inclusive, for each order are operable as stops to limit the extent of downward movement of the selecting slides 54 and 55. The electromagnetic devices 205 and 206 are operable to selectively release the selecting slides 54 and 55 for downward movement.

The electromagnetic devices 201 to 206, inclusive, in each order, are included in an electrical system extending from the typewriter 100 to the calculator 200 in order that the selecting slides 54 and 55 in the calculator 200 may be controlled by operation of switch members 101 to 109, inclusive, provided in the typewriter 100. Each selecting slide 54 or 55 is normally maintained in an upward position by means of a latch supported on the selecting slide and operable to engage a fixed apertured latch plate 207 supported in the calculator 200. For example, the selecting slide 54 shown in Fig. 1, is provided with a latch 208 pivotally supported at 209 on the selecting slide 54 and normally urged by means of a spring 210 to engage the upper edge 211 of the fixed latch plate 207, the spring 210 being attached at one end to the latch finger 208 and having the other end attached to the selecting slide 54. The selecting slide 55 is likewise provided with a pivotally supported latch finger 212, the free end of which is notched and operable to engage the edge of an aperture 213 formed in the latch plate 207, the latch finger 212 being normally urged into latching position by means of a spring 210, one end of which is attached to the latching finger 212 and the other end being attached to the selecting slide 55. Spring 214 attached at one end to the selecting slide 54 and at the other end to a link 272, of a pair of similar links 272 and 273, provides a means of normally urging the selecting slides 54 and 55 in a downward direction, the downward movement of the selecting slides 54 and 55, however, being normally prevented by means of the respective latch fingers 208 and 212 above mentioned.

Release of selecting slides

The latch fingers 208 and 212, respectively, are operable to be controlled by means of electromagnetic devices 206 and 205, respectively, one of which is operated each time a selecting slide is required to be moved in the operation of the calculating machine 200. If the value of a digit to be entered in the calculating machine is of a relatively low order and the selecting slide 55 is required to be operated, the electromagnetic device 205 is energized to bring about release of the latch finger 212 from engagement with the latch plate 207. If the digit to be entered into the calculator is of a relatively high order, the electromagnetic device 206 is energized to release the latch finger 208 from engagement with the latch plate 207. When the latch finger 208 or 212 is released at any time from engagement with the latch plate 207, the selecting slide 54 or 55 as the case may be, is moved downward by means of the spring 214. The extent of downward movement of the selecting slides 54 and 55 is determined by a spring-operated latch bolt controlled by operation of a latch hook which is pivotally supported and operably controlled by an electromagnetic device. The spring-operated latch bolt is operable to enter in a notch provided in the selecting slide so that the selecting slide may move a predetermined distance downward until a portion of the slotted part of the selecting slide comes into contact with the spring-operated bolt in the electromagnetic device. For example, as shown in Fig. 1, the selecting slide 54 is provided with a relatively small notch 215 in its upper portion. When the spring-operated bolt in the electromagnetic device 204 is released to enter in the space provided by the notch 215 and the selecting slide 54 is permitted to move downward by release of its latch finger 208, the selecting slide 54 will move downward until the upper edge of the notch 215 engages the spring-operated bolt in the electromagnetic device 204. Slightly below the position of the notch 215, a notch 216 of slightly larger dimension than the notch 215 is formed in the selecting slide 54. The notch 216 is operable to receive a spring-pressed bolt in the electromagnetic device 203 so that when the electromagnetic device 203 is energized, the bolt will operate to enter the notch 216 and control the downward movement of the selecting slide 54 to the extent permitted by the spring-pressed bolt in the electromagnetic device 203 and the size of the notch 216 formed in the selecting slide 54. Slightly below the position of the notch 216, a notch 217 is formed in the selecting slide 54, the notch 217 being slightly larger than the notch 216 and being operable to receive the spring-pressed bolt in the electromagnetic device 202 so that by cooperation of the spring-pressed bolt in the electromagnetic device 202 and the notch 217 in the selecting slide 54, the extent of movement of the selecting slide 54 in downward direction will be controlled as required. Slightly below the position of the notch 217 in the selecting slide 54 is a still larger notch 218 which in cooperation with a spring-pressed bolt in the electromagnetic device 201 provides a means for controlling the extent of downward movement of the selecting slide 54 when the electromagnetic device 201 is energized. The selecting slides 54 and 55 are provided with the same number and size of notches and the arrangement of the notches is the same in each case. The electromagnetic devices 201, 202, 203, 204 are all operable to control the movement of the selecting slides 54 and 55 since the spacing of the selecting slides 54 and 55 is approximately the same as the width of the spring-operated bolts in the electromagnetic devices 201 to 204, inclusive.

*Electromagnetic device*

Each electromagnetic device 201 to 206, inclusive, shown in Figs. 1, 2, 3 and 14 and identified as 233 in Fig. 14 comprises, as shown in Fig. 14, an energizing coil 219 supported on a post 220 mounted on the frame 221 by means of a mounting screw 222 or other suitable mounting means. The frame 221 is L-shaped in cross section and is apertured at 223 to accommodate an armature 224 which is L-shaped and carries at its lower free end a hook portion 225. The hook portion 225 is operable to engage a shoulder 226 formed on the side of a spring-urged bolt 227 which is apertured at spaced points and supported for slidable movement in a downward direction as shown in Fig. 14, the supporting means for the bolt 227 being a flanged post 228 secured in and extending from the body of the frame 221. A relatively large headed screw 229 also extends through an aperture in the bolt 227 and is mounted in the frame 221. The relatively large head of the screw 229 and the flange 230 on the post 228 prevent undesired movement of the bolt 227 relative to the frame 221. The bolt 227 is normally urged in a downward direction as shown in Figs. 14 and 3 by means of a spring 231 one end of which is secured to an upturned end portion 232 of the bolt 227, the other end of the spring 231 being secured to the post 228. The L-shaped armature 224 of the electromagnetic device 233 is pivoted at the point where it passes through the frame 221 and is provided with a biasing spring 234, one end of which is secured to the upper portion of the armature 224 while the other end is secured to a reduced end portion 235 of the post 228. In the position shown in Fig. 14, the armature 224 is operating to hold the bolt 227 in an elevated position with the spring 231 tensioned and ready to thrust the bolt 227 downward. The armature 224, however, under this condition, is operating as a latch to hold the bolt 227 against downward thrust. When the electromagnetic device 223 is energized the armature 224 will be rocked on its pivotal point of support through the frame 221 and the hook portion 225 on the armature 224 will be removed from engagement with the shoulder 226 on the bolt 227. Release of the hook portion 225 of the armature 224 from the shoulder 226 of the bolt 227 will allow the bolt 227 to be thrust downward under the action of the spring 231. It will be quite apparent therefore, that electromagnetic device 233 may be set with the bolt 227 in an upwardly latched position and ready for operation relative to a selecting slide 54 and 55. The bolt 227 is provided with an outwardly extending ear portion 236 extending alongside the lower portion of the armature 224 and operating as a guide for the movable armature 224. Extending outward from the bolt 227 is an outwardly struck tang 237 which may be engaged by one free end portion 238 of a lever 239 which is pivotally supported in the frame 221 on a rod 240. The rod 240 extends along the inside of a corner of the frame 221 which has arcuately formed strap portions 241 struck outwardly from the frame 221 and passing around the outer portion of the rod 240 and operating to hold the rod 240 in place and closely clamped in the corner portion 242 of the frame 221. The rod 240 serves as a support for a plurality of levers 239 of a plurality of electromagnetic devices 233 as shown in Fig. 3, and which are distributed in spaced relation along the common frame 221. The frame 221 is provided with spaced apertures 223 to receive the armatures 224 of the electromagnetic devices 233. The apertures 223 are larger at the top than at the bottom and notches are provided in opposite edge portions of each armature 224 to match with the edges of the lower portion of each aperture. The sides of the aperture 223 and the notches in the opposite edges of the armature 224 cooperate to hold the armature against undue longitudinal displacement in the aperture 223 and keep the armature fulcrumed at the required point for efficient operation of the electromagnetic device 233. As shown in Fig. 2, the plurality of frames 221 are supported between spaced side walls 243 and 244 so that the frames 221 and the side walls 243 and 244 cooperatively form a frame-like unit 245 suitable for mounting between the side plates 45 and 46 of a calculator 200, the side plates 45 and 46 being held in spaced relation by means of bars 246 and 247 extending transversely between the plates 45 and 46, the bar 247 having brackets 248 and 249 supported thereon which are attached to the side walls 243 and 244, respectively. The electromagnetic devices 205 and 206 in each set have bolt members slightly different in structure from the other bolt members in the set as will be subsequently explained.

*Operation of selecting slides*

The selecting slides 54 and 55 in each order, as shown in Figs. 1 and 2, are selectively controlled in their operation by selective operation of the electromagnetic devices 201 to 206, inclusive, in each order, the selecting slide 55 in each order position being selectively controlled by the operation of a low order electromagnetic device 205 and a selected one of the electromagnetic devices 201 to 204, inclusive, as required. The selecting slide 54 in each order is selectively controlled in its operation by selective operation of a high order electromagnetic device 206 and one of the electromagnetic devices 201 to 204, inclusive, as required. The electromagnetic devices 201 to 206, inclusive, after de-energization, may be restored to normal condition by operation of restoring bars 250 which are provided individually for each order position in the selector of this invention. The restoring bars 250 are supported on an apertured latch plate 207 which is disposed between and supported by the side walls 243 and 244. Elongated apertures 251, as shown in Fig. 2, are provided in the restoring bars 250 to accommodate relatively large headed rivets 252 which are mounted in the latch plate 207 so that the shank portions extend through the elongated apertures 251. The restoring bars 250 are provided with apertures 393 located at spaced points to accommodate end portions 253 of the bellcrank levers 239 each of which serves as a restoring member for an individual electromagnetic device 233, as shown in Fig. 14. When the restoring bar 250 is moved upwardly through and beyond the position shown in Fig. 1, the bellcrank levers 239 are all operated to restore any of the bolts 227 which have been released to extend into the path of movement of the selecting slides 54 or 55. The restoring bar 250 will also operate to restore bellcrank levers 239 of the electromagnetic devices 205 and 206 provided for selective operation of the selecting slides 54 and 55 as required to determine the high or low order of the digit entered in the calculator 200.

Simultaneously with the restoring of the armatures in the electromagnetic devices 201 to 206, inclusive, the selecting slides 54 and 55 are restored to normal position and so that their latch members 208 and 212 are in engagement with the apertured plate 207 and in the position in which the selecting slides 54 and 55 are under the tension of the spring members 214 provided in each case. The restoring members for the electromagnetic devices 201 to 206, inclusive, and selecting slides 54 and 55 comprise a double bail member 254 having a pair of operating arms 255 and 256 pivotally supported between the side walls 243 and 244, respectively, by a bolt member 257 which extends through apertures provided in the operating arms 255 and 256 and into the respective side walls 243 and 244 as required. Extending transversely between the operating arms 255 and 256 and attached to the operating arms 255 and 256 is a bar 258 in which are mounted at spaced intervals two rows of adjustment screw members 259, the upper row 260 of which are arranged in register with the restoring bars 250 of the various orders. The adjustment screws in the lower row 261 are arranged in register with the selecting slides 54 and 55 provided in each order of the selecting device. The head portions of the adjustment screw members in the lower row 261 are large enough in diameter to simultaneously contact and move the selecting slides 54 and 55 in each individual order position. The adjustment screw members 259 are provided with locknuts 263 to hold them in adjusted position, and screw driver kerfs 264 are formed in the ends of the adjustment screws 259 to facilitate adjustment of the screws 259 relative to the parts to be engaged by the head portions of the screws.

For example, the adjustment screws 259 in the upper row 260 may be adjusted relative to the individual restoring bars 250, so that each bar 250 will, upon operation of the bail member 254, move the required distance to reset back to normal, the bolts 227 of the electromagnetic devices 233. The adjustment screws 259 in the lower row 261 may be adjustably set relative to the individual orders of selecting slides 54 and 55 so that upon operation of the bail member 254 in the required direction, the selecting slides 54 and 55 will be all moved up against the actions of springs 214 until the latch fingers 208 and 212 engage their required portions in the apertured latch plate 207.

*Restoring solenoids*

The restoring solenoids 265 and 266 are provided to restore movable parts of the selecting apparatus to normal condition through operation of the bail member 254. The restoring solenoids 265 and 266 are mounted on a bridge member 267 extending across the lower end of the selecting apparatus. The restoring solenoids 256 and 266 are of conventional form and comprise, as shown in Fig. 1, an operating coil 268, a laminated plunger type armature 269 bearing a cross arm 270 and spaced arms 271 and 274, secured to the plunger type armature 269. The arms 271 and 274 are apertured to accommodate a bolt 275 which extends through an elongated aperture 276 formed in the upper end of a lever 277 which is pivotally supported on a shaft 278 mounted in and extending from a side wall 243 or 244 as the case may be, as shown, for example in Fig. 1, in which a shaft 278 extends from the side wall 243. The lever 277 is pivotally attached at 279 to the operating arm 255 or 256 as required. It will be seen by looking at Fig. 2, that there are two restoring solenoids 265 and 266 for operating the double bail member 254, and that the restoring solenoids are of a relatively heavy duty type and that when energized to pull the armatures inwardly of the operating coils, the lever 277 will be moved in a clockwise direction and the operating arms 255 and 256 will be moved in a counterclockwise direction to bring the two rows of adjustment screws 259 into engagement with the restoring bars 250 and the selecting slides 54 and 55 as required to move the parts diagonally upward as shown in Fig. 1 to the required positions for resetting the movable parts of the selecting apparatus.

With one exception the electromagnetic devices 205 and 206 are constructed like the electromagnetic devices 201 to 204, inclusive. The exception is that in the electromagnetic device 206 as shown in Fig. 3, one corner of the lower portion of the bolt 378 is cut away and the other corner of the bolt 378 is offset to provide a leg portion 376 so that the electromagnetic device 206 would not control the selecting slide 55 which is of the low order, but will control only the selecting slide 54 which is of the high order. The bolt 377 of the electromagnetic device 205 has a right-hand offset lower portion 375 so that it will control only the selecting slide 55 which is of the low order. The bolts 377 and 378 of the electromagnetic devices 205 and 206 are provided with the offset portions 375 and 376, respectively, so that in the case of the electromagnetic device 205, there will be a piece of the bolt 377 extending down in the form of a leg 375 to come into engagement with the latch finger 212 on the selecting slide 55 to press down the latch finger 212 when the electromagnetic device 205 is energized. Electromagnetic device 206 has the lower end of its bolt 378 provided with the offset leg portion 376 extending into engagement with the latch finger 208 on the selecting slide 54 so that upon energization of the electromagnetic device 206 the latch finger 208 will be downwardly pressed by the bolt 378 to release the latch finger 208 from engagement with the fixed latch plate 207 to permit downward movement of the selecting slide 54, to the extent permitted by a selecting one of the electromagnetic devices 201 to 204, inclusive, which, when operated, will release its bolt 227 to come into the area of a notch formed in the selecting slide and stop the downward movement of the selecting slide at a required point for bringing into engagement a toothed wheel 56 with the actuating cylinder 58. When the wheel 56 is brought into engagement with the actuating cylinder 58 the wheel 56 on the square shaft 57 is rotated to rotate the square shaft 57 and the gears 72 and 73 thereon, one of which will be brought into engagement with the gear 74 on the numeral wheel shaft 76 to drive the numeral wheel 17 in the required direction to register the amount required to be registered in the calculating device 200. The transmission of power from the actuating cylinder 58 to the gear wheel 56 to enter required amounts in the calculating apparatus 200, is the same as occurs in similar operations in a calculating apparatus of conventional form and not equipped with this invention. For example, if numeral keys in a manually operated calculator apparatus 200 of conventional form, were selectively operated for the same values as the electromagnetic devices 201 to 206, inclusive, are operated in this invention, the amounts entered in the calculator apparatus 200 would be the same.

The calculating apparatus of the present invention as shown in Fig. 1, is provided with means for operating electrical switches constructed and arranged so that the amounts registered in the calculator apparatus 200 may be in ffect read out of the calculator apparatus and transmitted as signals through an electrical system to operate electromagnetic devices provided in a typewriting apparatus so that the typewriting apparatus may be controlled automatically from the calculator apparatus to typewrite the amounts accumulated in the calculator apparatus.

*Readout switches*

The readout switches are selector type switches comprising a plurality of fixed contacts and a wiper contact to sweep over the fixed contacts to selectively find a live circuit condition. The selector type switches as shown in Fig. 4, and identified as 300, are located in the carriage 16 of the calculating apparatus and are individual to the numeral wheels 17 provided in the calculator. The wiper contact 301 in the switch 300 is mounted on a metal cap 302 supported on a reduced diameter upper end portion of a stem 303 of the numeral wheel 17. The wiper contact 301 is rotated when the numeral wheel 17 is rotated, the wiper contact 301 being operated in succession over fixed contacts in a set of fixed contacts 304 and representing digits from "0" to "9," inclusive. The set of fixed contacts 304 are supported on a mounting strip 305 of insulating material which is apertured to accommodate the fixed contacts in the switches and metal caps 302, so that the upper end of the metal cap extends considerably above the upper surface of the mounting strip 305. The upper end of each metal cap 302 extends into spring-pressed engagement with a leaf-type spring contact 306 which is supported by means of a bolt 307 on an insulating strip 308 which is mounted above the surface of the mounting strip 305. Supported on the upper surface of the insulating strip 308 are leaf-spring contacts 306, which are apertured at one end and secured in place on the insulating strip 308 by means of contact rivets 309, the contact rivets 309 having shanks which extend through suitable apertures provided in the insulating strip 308. The shank portions of the contact rivets 309 extend through apertures in the leaf-spring contacts and hold one end of each leaf-spring contact in place on the insulating strip 308. The free end portions of the leaf-spring contacts 306 bear on the tops of the metal caps 302 carrying the wiper contacts of the selector type switches 300. The main portions of the readout selecting switches 300 are carried back and forth in a reciprocating motion during the time of readout of the calculator by means of the reciprocating carriage 16. As the carriage 16 moves in its reciprocating motion the contact rivets 309 are successively carried under and into contact with a conducting button 356 mounted on the free end of a relatively stationary leaf spring 311, one end of which is mounted by means of a mounting screw 312 on a stationary part of the calculator, the stationary part as shown in Fig. 4 being a platform 313 which is mounted on spaced pillars 314 supported in a fixed bar 315 of the calculator 200. An adjustment screw 316 is provided to regulate the pressure of the leaf spring contact toward the contact rivets 309, the adjustment screw 316 being mounted in and extending through the platform 313 and into engagement with the under surface of leaf spring 311.

The insulating mounting strip 305 is provided with sets of notches of graduating depth along two opposite edge portions to receive and hold wires leading to and from the fixed contacts 304 in the readout selector switches 300. As shown in Fig. 9, and in which two stator elements of the readout selector switches are shown, the fixed contacts in one of the switches are connected to like fixed contacts of the other switch by means of conductor wires which are run from one contact to the other and are held in spaced relation in required areas to attain an even distribution of wiring, the wires being maintained in fixed relation and properly spaced from each other by virtue of the notches in the insulating strip 305.

Calculating machines of the type employed in this invention are of the type in which the amounts registered in the calculating machine are shown by the display of numerals on the numeral wheels, such for instance, as the numeral wheel 17 shown in Figs. 1 and 4. The numeral wheels are rotated as different amounts are put into the calculating machine. For example, if the numeral "1" is put into the calculating machine the numeral wheel 17 will register the numeral "1". If another amount is uut into the calculating machine and it is operated to add the second amount to the first, the numeral wheel or wheels will show the sum of the amounts entered into the calculating machine. Subtractions are obtained by reverse rotation of the numeral wheels by suitable operation of the calculating machine. Multiplications are obtained by putting into the calculating machine the two amounts required and by operating the calculating machine in the usual manner for multiplication, the product being shown by the numeral wheels in the calculating machine. It will be appreciated that the wiper contacts of the readout selector switches which are arranged for rotation by means of the spindles of the numeral wheels, will be moved relative to fixed contacts in the readout selector switches in accordance with the amounts accumulated in the numeral wheels. Since the wiper contacts in the readout selector switches are carried on the stems of the numeral wheels and are rotated to successively engage the fixed contacts with the readout selector switches and will come to rest on a fixed contact representing the amount put into the calculating machine, amounts calculated by the calculating machine can be, in effect, read out of the calculating machine and into the typewriter by means of the readout selector switches in combination with the solenoids and numeral recording means of the typewriter.

In the readout operation the carriage of the calculating machine is reciprocated under the fixed contact 356 which in succession serves as the readout contact for each of the readout selector switches as each switch comes along under the fixed contact 356. For example, if the wiper contact of the readout selector switch at the instant of readout were on fixed contact "9" in the readout selector switch 300 (Fig. 9) the "9" numeral relay or solenoid in the typewriter would be operated and the "9" would be printed by the typewriter. In its reciprocating motion the calculator carriage 16 rides along fixed rails 317 and 318 supported on their fixed supports 319 and 320, respectively, the carriage 16 having a bar 321 bearing on the rail 318 and having a rear flanged portion 322 bearing on the rail 317.

The typewriter

The typewriter 100 as shown briefly in Fig. 5, comprises a suitable frame 112 in which are mounted sets of manually operable keys 113 operable through linkages 114 to cause key bars 115 carrying type symbols 116 to strike a platen 117. The keys 113, linkages 114, key bars 115 and type symbols 116, as well as the platen 117, are conventional in electrically operated typewriters. In the present invention, however, the typewriter has been modified by the addition of solenoids 360 (for example 362) to operate the keys 113 that consequently cause the key bars 115 to operate to bring the type symbols 116 into engagement with the platen 117. The typewriter 100 has also been modified by the addition of a set of switches 166 which may be Acro switches of the type shown or any switches suitable for the purpose, and operable by movable pins 126 which are operable by the linkages 114 each time a number key 113 and a solenoid 360 is operated in the typewriter. The switches 166 are mounted on a suitable apertured bar 120 which is mounted in the typewriter 100 so that it extends transversely across the position of linkages 114 in the typewriter structure. Bar 120 supports movable pins 126 and comprises a bracket portion 121 bolted in place by the bolts 122, the bracket 121 being apertured to receive mounting bolts 123 which extend through apertures in the switches 166. The linkages 114 are operable to move the pins 126 to operate the switches 166.

It will be seen from the above description that the calculating machine 200 may be automatically controlled from the typewriter 100 and that the typewriter 100 in turn can be automatically controlled from the calculator 200. When a numeral key in the typewriter is operated, a corresponding electromagnetic device 201 to 204, inclusive, is operated and an electromagnetic device 205 or 206 according to the relatively high or low order of the number entered, is operated, to control the movement of selecting slides 54, 55 in the calculator 200, to bring into association with the actuating cylinder 58, a wheel 56 operable to transmit motion of the actuating cylinder 58 to the required numeral wheel in the calculator 200. When the calculator 200 has entered and registered the required numeral on its numeral wheel 17, the amount registered on the numeral wheel 17 may be read back from the calculating machine 200 to operate a corresponding solenoid in the typewriter 100 to condition the typewriter to print the number corresponding to the amount registered in the calculator 200. For example, assuming that the numeral "1" key in the typewriter 100 is operated, and the carriage of the typewriter is in a required position, the electromagnetic device 204 and the electromagnetic device 205 in the calculator 200 will be operated so that the selecting slide 55 in the first order position of the calculator 200 will be operated to move the numeral wheel 56 into engagement with the first tooth position of the actuating cylinder 58 so that upon subsequent and usual operation of the calculator 200 by its motor 81, the numeral wheel 56 will be rotated once by the single tooth in the actuating cylinder 58. A plus key, not shown but which is standard equipment in the calculator of the type used in this illustration, may be remotely controlled from the typewriter by means of a solenoid of conventional form, and through a simple circuit not shown, or the plus key in the calculator 200 may be manually operated as required.

The present invention is not pertinent to the manual or remote methods or features of operation of the function keys of the calculating machine 200, the invention residing in the means provided for controlling the operation of the selecting means comprising systems of selecting slides in the calculator.

By placing Figs. 6, 7, 8, 9 and 10 in the respective positions shown in Fig. 11, the circuit for operation of the calculator 200 from the typewriter 100 for a single order of numerals may be traced. The switches 101 to 109, inclusive, shown in Fig. 6, and as the set of switches 166 shown in Fig. 5, may be double-contact switches in which movement of a single movable member into engagement with the contact also operates to engage the contact with a second contact in the switch. The movable members in the switches shown in Fig. 6, are in electrical connection with the ground conductor 124 and it will be seen that operation of the movable member 125 in the switch 101, will operate to connect the movable member to contact 126 and the contact 126 of switch 101 will be moved into engagement with contact 127 of the same switch. Closing of switch 101 will provide a circuit as follows for the operation of electromagnetic device 205 and electromagnetic device 204 over the following circuit: Source of current supply 128, conductor 129, conductor 130, rectifier 131, conductor 132, winding of electromagnetic device 205, conductor 133 in Fig. 8, conductor 133 in Fig. 6, conductor 134, contact 127, contact 126, movable member 125, conductor 124 to ground. Over this circuit electromagnetic device 205 will be operated to cause the low order selecting slide 55 to be released for downward movement, energization of electromagnetic device 205 being operable to release its bolt 227 to press down on the latch finger 212 and release the latch finger from engagement with the latch plate 207. Simultaneously with the completing of the circuit for the operation of the electromagnetic device 205, a circuit will be completed for operation of the electromagnetic device 204 which may be traced as follows: Source of current supply 128, conductor 129, conductor 130, rectifier 135, winding of electromagnetic device 204, conductor 136, through Fig. 8, conductor 136 in Fig. 6, contact 126, movable member 125 of switch 101, conductor 124 to ground. Operation of the numeral key "2" in the typewriter 100 will cause operation of the electromagnetic device 205 and the electromagnetic device 203 over the following circuits, respectively, so that the numeral "2" may be entered in the calculator 200. For this operation of the electromagnetic device 205, the circuit would be almost the same as for the operation for entry of the numeral "1" and as follows: Source of current supply 128, conductor 129, conductor 130, rectifier 131, conductor 132, winding of electromagnetic device 205, conductor 133 in Fig. 8, conductor 133 in Fig. 6, conductor 144, contact 143, contact 141, movable member 142, conductor 124 to ground. Operation of the typewriter key for the numeral "2" in the typewriter will result in the closing of switch 102 and the energization of the electromagnetic devices 203 and 205 in the selector apparatus to operate the calculator apparatus 200 to record in its accumulator the value for the digit "2" entered therein. The electromagnet 205 under this condition is energized to allow the selecting slide 55 to move in a downward direction, and the operation of the electromagnetic device 203 is caused to allow its bolt 227 to move downward into the space 216 in the selecting slide 55 so that when the selecting slide 55 moves downward, it will be stopped by the bolt 227 of the electromagnetic device 203 at a required position for the gear wheel 56 to be in register with and engaged by two teeth in the rotating actuating cylinder 58. The circuit for the energization of the electromagnetic device 205 in this case is as follows: Source of current supply 128, conductor 129, conductor 130, rectifier 131, winding of electromagnetic device 205, conductor 133 in Fig. 8, conductor 133 in Fig. 6, conductor 144, contacts 143, 141 and movable contact 142, of switch 102, conductor 124 to ground. The circuit for energization of the electromagnetic device 203 may be traced as follows: Source of current supply 128, conductor 129, conductor 130, rectifier 138, winding of electromagnetic device 203, conductors 139 and 140 in Fig. 8, conductor 140 in Fig. 6, contact 141 and movable contact 142 in switch 102, conductor 124 to ground.

Operation of the typewriter key for the digit "3" will result in the closing of switch 103 in the typewriter 100 and energization of the electromagnetic devices 205 and 202 as follows: Source of current supply 128, conductor 129, conductor 130, rectifier 131, winding of electromagnetic device 205, conductor 133 in Fig. 8, conductor 133 in Fig. 6, conductor 145, contacts 148, 146, and movable contact 147 of switch 103, conductor 124 to ground. For the energization of the electromagnetic device 202 for the registration of the numeral "3" the circuit is as follows: Source of current supply 128, conductor 129, conductor 130, rectifier 149, winding of electromagnetic device 202, conductors 150 and 151 in Fig. 8, conductor 151 in Fig. 6, contact 146 and movable contact 147 of switch 103, conductor 124 to ground.

Operation of the typewriter key for the numeral "4" will result in closing of the switch 104 in the typewriter and energization of the electromagnetic devices 205 and 201 in the selector apparatus of the calculator 200 so that the value of "4" will be entered in the calculator apparatus 200. The circuit for the energization of the electromagnetic device 205 for this low order selection operation is as follows: Source of current supply 128, conductor 129, conductor 130, rectifier 131, winding of electromagnetic device 205, conductor 133 in Fig. 8 to conductor 133 in Fig. 6, conductor 151, contacts 153, 152, and movable contact 154 in switch 104, conductor 124 to ground. The following circuit is also closed for the energization of the electromagnetic device 201. Source of current supply 128, conductor 129, conductor 130, rectifier 155, winding of electromagnetic device 201, conductors 157 and 158 in Fig. 8, conductor 158 in Fig. 6, contact 152 and movable contact 154 of switch 104, conductor 124 to ground.

Operation of the "5" key in the typewriter 100 will result in the closing of switch 105 in the typewriter and the operation of the electromagnetic device 205 for a low order digit entry. The circuit for the operation of the electromagnetic device 205 in this case may be traced as follows: Source of current supply 128, conductor 129, conductor 130, rectifier 131, conductor 132, winding of electromagnetic device 205, conductor 133 in Fig. 8, conductor 133 in Fig. 6, contacts 159, 158 and movable contact 160 in switch 105, conductor 124 to ground. When the electromagnetic device 205 in the selector is operated and no other electromagnetic device associated with the selecting slides 54 and 55 is operated, the low order selecting slide 55 moves down to its full traverse in which case the gear wheel 56 is in register with five teeth in the rotating actuating cylinder 58, so that a value of "5" is entered in the calculator apparatus 200 and is registered in the corresponding numeral wheel 17 of the accumulator portion of the calculator.

Operation of the "6" key in the typewriter 100 will close the switch 106 in the typewriter and result in the energization of the electromagnetic devices 206 and 204 in the selector apparatus of the calculator apparatus 200. It will be noticed that in this case since the digit "6" is in the relatively high order of digits and requires operation of the selecting slide 54, the high order electromagnetic device 206 is energized rather than the low order electromagnetic device 205. When the electromagnetic device 204 is operated, the bolt 227 thereof is permitted to move downward into the space defined by the slot 215 in the selecting slide 54. The bolt 227 also extends into the space defined by the slot 215 in the selecting slide 55. However, since the relatively high order electromagnetic device 206 is operated in this case, rather than the electromagnetic device 205 for the relatively low order digits, the selecting slide 54 is released for operation rather than the selecting slide 55, and the selecting slide 54 moves downward to the extent permitted by the bolt 227 of the electromagnetic device 204 entering in the slot 215 in the selecting slide 54. When electromagnetic devices 204 and 206 are operated, the gear wheel 56 controlled by the selecting slide 54 is moved into register with, and engagement by six teeth in the actuating cylinder 58 which is rotating, and through the gear 56 applies six cyclic movements to the square shaft 57 which carries a rotative drive from the actuating cylinder 58 through the gears on the spool 71 and the shaft 76 to the numeral wheel 17 in the calculator. The circuits for energization of the electromagnetic devices in this case may be traced as follows: Source of current supply 128, conductor 129, conductor 130, rectifier 135, winding of electromagnetic device 204, conductor 136, conductor 161 in Fig. 8, conductor 161 in Fig. 6, contact 162 and movable contact 163 in switch 106, conductor 124 to ground. The circuit for the energization of the electromagnetic device 206 for controlling the relatively high order selecting slide 54 may be traced as follows: Source of current supply 128, conductor 129, conductor 130, rectifier 164, winding of electromagnetic device 206, conductor 165 in Fig. 8, conductor 165 in Fig. 6, conductor 167, contact 168, contact 162 and movable contact 163 in switch 106, conductor 124 to ground.

Operation of key "7" in the typewriter 100 for the printing of the digit "7" by the typewriter will result in the closing of switch 107 in the typewriter 100 and the consequent energization of the electromagnetic devices 206 and 203 in the selecting apparatus in the calculator 200. Operation of the electromagnetic devices 206 and 203 in combination controls the operation of the relatively high order selecting slide 54 to bring the gear wheel 56 into register and engagement with seven teeth on the actuating cylinder 58. When the selecting slide 54 moves down to the extent permitted by the bolt 227 of the electromagnetic device 203 extending into the slot 216 formed in the selecting slide 54, the registration in the calculator apparatus 200 will be of the value of "7" digits. The circuit for energization of the electromagnetic device 203 in this case may be traced as follows: Source of current supply 128, conductor 129, conductor 130, rectifier 138, winding of electromagnetic device 203, conductors 139 and 169 in Fig. 8, conductor 169 in Fig. 6, contact 170 and movable contact 171 of switch 107, conductor 124 to ground. The circuit for the energization of the relatively high order electromagnetic device 206 may be traced as follows: Source of current supply 128, conductor 129, conductor 130, rectifier 164, winding of electromagnetic device 206, conductor 165 in Fig. 8, conductor 165 in Fig. 6, conductor 174, contacts 175, 170 and movable contact 171 of switch 107, conductor 124 to ground.

Operation of key "8" in the typewriter will result in the closing of switch 108 in the typewriter and the energization of the electromagnetic devices 202 and 206 in the selecting apparatus of the calculating machine 200. Operation of the electromagnetic devices 202 and 206 in combination will control the movement of the selecting slide 54 to bring about the registration in the calculator apparatus 200 of the value of "8" digits through the operation in combination of the actuating cylinder 58, the gear 56, the square shaft 57, the spool 71 and gears thereon, and the gear wheel 74 on the shaft 76 on which is supported the numeral wheel 17. The circuit for operation of the electromagnetic device 202 in this case may be traced as follows: Source of current supply 128, conductor 129, conductor 130, rectifier 149, winding of electromagnetic device 202, conductor 150, conductor 176 in Fig. 8, conductor 176 in Fig. 6, contact 177, and movable contact 178 of switch 108, conductor 124 to ground. The circuit for operation of the relatively high order electromagnetic device 206 through the switch 108 may be traced as follows: Source of current supply 128, conductor 129, conductor 130, rectifier 164, winding of electromagnetic device 206, conductor 165 in Fig. 8, conductor 165 in Fig. 6, conductor 179, contacts 180, 177 and movable contact 178 in switch 108, conductor 124 to ground.

Operation of the "9" key in the typewriter apparatus 100 will result in the closing of switch 109 in the typewriter 100 and energization of the electromagnetic devices 201 and 206 in the selector apparatus of the calculator 200. Operation of the electro-magnetic device 201 will result in the extension of its bolt 227 into the space defined by the slot 218 in the selecting slide 54, and also into the space defined by the slot 218 in the selecting slide 55. When the electromagnetic device 206 is operated in this case, the bolt 227 in the electromagnetic device 206 is released for downward movement and operates to press the latch finger 208 out of engagement with the latch plate 207 so that the selecting slide 54 will move downward under the power of the spring 214 to the extent permitted by the size of the slot 218 in the selecting slide 54 and the movement of the upper edge of the slot 218 into engagement with the bolt 227 of the electromagnetic device 201. The circuit for energization of the electromagnetic device 201 in this case may be traced as follows: Source of current supply 128, conductor 129, conductor 130, rectifier 155, winding of electromagnetic device 201, conductor 157, conductor 181 in Fig. 8, conductor 181 in Fig. 6, contact 182 and movable contact 183 in switch 109, conductor 124 to ground. The circuit for energization of the electromagnetic device 206 in this case may be traced as follows: Source of current supply 128, conductor 129, conductor 130, rectifier 164, winding of the electromagnetic device 206, conductor 165 in Fig. 8, conductor 165 in Fig. 6, contacts 184, 182, and movable contact 183 of switch 109, conductor 124 to ground.

When the typewriter key "0" is operated the typewriter will print the cipher in the usual way but no switch is provided to control the calculator apparatus 200. Therefore, no entry will be made in the calculator apparatus 200.

It will be seen by looking at Fig. 2, that a plurality of selecting slides 54 and 55 are provided to make the selector suitable for operation of an apparatus involving many ordinal columns or positions. In this figure there are ten rows of sets of electromagnetic devices, 201 to 206, inclusive, to take care of selectively controlling ten pairs of selecting slides 54 and 55.

Restoration of the selecting slides

To restore the selecting slides to normal positions by remote control, a switch 185 is provided in the typewriter apparatus 100, which, as shown in Fig. 12, is provided with a switch box section 389, in which the switch 185 may be mounted. Upon closure of the switch 185, twin restoring solenoids 265 and 266 in the selecting apparatus will be operated to cause operation of the bail member 254 shown in Figs. 1 and 2. The counterclockwise movement of the bail member 254 will move the lower row of screws 259 to operate to move all the selecting slides 54 and 55 upward until the latch fingers 208 and 212 for the respective selecting slides 54 and 55, engage the latch plate 207 and prevent the springs 214 from moving the selecting slides 54 and 55 downward until further selectively released. The upper row of screws 260 in this case engages the restoring bars 250 and moves them upwardly to move the bellcrank levers 239 of the electromagnetic devices 201 to 206, inclusive, to move the bolts 227 upwardly to normal position and until they are engaged by the hook portions 225 of the armatures 224 to latch the bolts 227 in upward normal position and under the tension of the springs 231. The twin restoring solenoids 265 and 266 are provided in the form and arrangement disclosed in Fig. 2, in which the solenoid 265 is at one corner of the selecting apparatus and solenoid 266 is disposed directly across and in the same plane as the solenoid 265 to insure that there will be a substantial thrust on the bail member 254 at each end of the bail member structure to prevent undue bending of the bail member 254. The restoring solenoids 265 and 266 are simultaneously operated and are connected in parallel as shown in Fig. 10, so that they may be operated simultaneously under control of the switch 185 in the typewriter 100. The circuit for operation of the solenoids 265 and 266 may be traced as follows: Source of current supply 128, conductor 129, conductor 186 in Fig. 10, windings of solenoids 265 and 266 in parallel, conductor 187 in Fig. 10, conductor 187 in Fig. 6, fixed contact 188 and movable contact 189 of switch 185, conductor 190, conductor 124 to ground. The closing of switch 185 and the resulting operation of the restoring solenoids 265 and 266, may be employed whenever it is desirable or necessary to restore the selecting slides 54 and 55 and the electromagnetic devices 201 to 206, inclusive, to normal condition. Restoring of the selecting slides 54 and 55, and the restoring of the electromagnetic devices 201 to 206, inclusive, will have no effect on the accumulator apparatus in the calculator 200 which may be operated in its usual manner or by remote control means, not shown, to get a carriage clear condition.

Multiple position operation of the apparatus

Thus far we have been dealing mainly with the operation of selecting slides 54 and 55 in one ordinal position of the calculator 200. As shown in Fig. 2, however, the selector is adapted for use in controlling selectively the operation of a plurality of relatively high order and low order selecting slides 54 and 55. It will be seen in Fig. 2, that a set of electromagnetic devices 201 to 206, inclusive, is provided for each ordinal position in the calculator apparatus 200 and that the selecting slides 54 and 55 in each ordinal position may be selectively operated by the set of electromagnetic devices 201 to 206, inclusive, provided for each position, in the same manner as the selecting slides 54 and 55 were operated for the single ordinal position thus far described and traced.

It will be appreciated that as digits are entered into the calculator apparatus 200 and it becomes necessary to carry from one order into the next order, the calculator apparatus operates in its usual manner and the carriage thereof moves as required to put the values in the required order positions. It will also be appreciated that there is a moving carriage in the typewriter apparatus 100 and that by suitable tabulating operation of the typewriter apparatus, values to be printed may be set in required columns and ordinal positions of both the typewriter apparatus and the calculator apparatus 200.

As shown in Fig. 13, a selector apparatus comprising a plurality of sets of electromagnetic devices 201 to 206, inclusive, is provided to, in effect, take the place of the usual manual key-board found in calculating machines of the type heretofore mentioned. Each set of electromagnetic devices 201 to 206, inclusive, takes care of one ordinal position in the calculator apparatus 200. In the drawing ten orders are shown to take care of the same number of pairs of selecting slides in the calculator apparatus 200. The dot-dash lines in the drawing indicate that certain parts of the apparatus shown in the drawing are in different locations, for example, the apparatus shown above the higher dot-dash line and the apparatus shown below the lower dot-dash line will be found in the typewriter apparatus 100, and the apparatus shown between the two dot-dash lines will be found in the calculating apparatus 200. It will be seen, that in the apparatus shown below the lower dot-dash line, there may be found the set of typewriter switches 101 to 109, inclusive, the movable members of which are connected to ground and the double contact members of the switches being operable to be connected by suitable conductors to the banks of electromagnetic devices 201 to 206, inclusive, in each horizontal row.

Commutator

Also located above the upper dot-dash line in Fig. 13, there is shown a commutator 281, comprising an insulating strip 282, a conductor bar 283 and spaced fixed contacts 284 to 293, inclusive, which are connected by suitable conductor wires to the various electromagnetic devices 201 to 206, inclusive, in the various orders. The insulating strip 282 may be supported on the fixed part 296 of the typewriting machine 100 and carries the conducting bar 283 and the spaced electrical contacts 284 to 293, inclusive. A double-ended wiper contact 380 is provided to wipe over the conducting bar 283 and the spaced electrical contacts 284 to 293, inclusive. The wiper contact 380 is mounted on and carried by an arm 294 which may be supported on the movable carriage 295 of the typewriter 100, and as the carriage is tabulated along to various positions, the wiper contact 380 bears at one end on the conducting bar 283 and at the other end selectively makes contact with the spaced contacts 284 to 293, inclusive, so that as the carriage of the typewriter is tabulated along to various ordinal positions, the corresponding set of electromagnetic devices 201 to 206, inclusive, for each ordinal position, is in effect picked up and conditioned for inclusion in a circuit when the switches 101 to 109, inclusive, in the typewriter are operated. It will be seen therefore, that as a digital value is typed in the typewriter apparatus 100 and the carriage of the typewriter is moved along in its normal tabulating operation, the selecting apparatus in the calculator 200 will be conditioned for putting into a corresponding ordinal position the selection corresponding to the number being typed on the typewriter 100. For example, assuming that the electrical typewriter is operably energized and that by suitable tabulations the wiper contact is moved from right to left to engage the conductor bar 283 and the segmental contact 284 in the tenth position; under this condition, if the switch 101 in the typewriter apparatus is first operated, the electromagnetic devices 204 and 205 in the tenth place ordinal position (counting from right to left in Fig. 13) of the calculator 200 will be energized to condition the selecting slide 55 in the tenth place to perform its normal function of conditioning the calculator apparatus for the accumulation in the numeral wheel 17, the value "1" for the digit typed by the typewriter. As the digit "1" is typed by the typewriter, the typewriter carriage moves over one space so that the wiper contact 380 will be resting with one of its end portions on the conducting bar 283 and the other of its end portions on the fixed contact 285. If another digit "1" is typed by the typewriter the electromagnetic devices 204 and 205 in the ninth ordinal position, will be energized simultaneously with the closing of the switch 101 in the typewriter 100. The circuit for entering of this second digit "1" may be traced as follows: Source of current supply 128, conductor 129, conductor bar 283, movable contact 380, segmental contact 285, conductor 191, rectifier 192, conductor 193, winding of electromagnetic device 204 in the ninth position, conductor 136, conductor 161, contact 126 and movable contact 125 of switch 101, conductor 124 to ground. The circuit for the energization of the relatively low order electromagnetic device 205 in the ninth ordinal position may be traced as follows: Source of current supply 128, conductor 129, conducting bar 283, movable contact 380, segmental contact 285, conductor 191, rectifier 194, conductor 195, winding of electromagnetic device 205 in the ninth ordinal position, conductor 133, conductor 134, contacts 127, 126, and movable contact 125 of switch 101, conductor 124 to ground.

When the numeral "3" is typed by the typewriter for the eighth ordinal position and switch 103 in the typewriter is closed, the electromagnetic devices 202 and 205 in the eighth ordinal position will be energized, to condition the calculator 200 for the entering therein of the value "3" in the eighth ordinal position. In this case the circuit for the operation of the electromagnetic device 202 may be traced as follows: Source of current supply 128, conductor 129, conducting bar 283, wiper contact 380, segmental contact 286, conductor 196, rectifier 197, conductor 198, winding of electromagnetic device 202 in the eighth ordinal position, conductor 150, contact 146 and movable contact 147 of switch 103, conductor 124 to ground. Simultaneously with the energization of the electromagnetic device 202 in the eighth ordinal position, the electromagnetic device 205 in the eighth ordinal position will be energized over the following circuit: Source of current supply 128, conductor 129, conducting bar 283, wiper contact 380, segmental contact 286, conductor 196, rectifier 297, conductor 298, winding of electromagnetic device 205 in the eighth ordinal position, conductor 133, conductor 134, contacts 148, 146 and movable contact 147 of closed switch 103, conductor 124 to ground.

The typing of the numeral "4" in the typewriter 100 will result in the closing of switch 104 and the energization of electromagnetic device 201 and electromagnetic device 205. If the typing of the numeral "4" is for the seventh ordinal position, the circuit for the operation of the electromagnetic device 201 may be traced as follows: Source of current supply 128, conductor 129, conducting bar 283, wiper contact 380, segmental contact 287, conductor 299, rectifier 323, conductor 324, winding of electromagnetic device 201 in the seventh ordinal position, conductor 157, conductor 158, contact 152 and movable contact 154 of switch 104, conductor 124 to ground. The circuit for the energization of the relatively low order electromagnetic device 205 in the seventh ordinal position may be traced as follows: Source of current supply 128, conductor 129, conducting bar 283, wiper contact 380, segmental contact 287, conductor 299, rectifier 325, conductor 326, and winding of electromagnetic device 205 in the seventh ordinal position, conductor 133, conductor 134, contacts 153, 152 and movable contact 154 of switch 104, conductor 124 to ground.

The typing of the numeral "5" in the typewriter 100 with the consequent closing of the switch 105 will result in the energization of a relatively low order electromagnetic device 205. The energization of electromagnetic device 205 will operate to release the selecting slide 55 for downward movement to its fullest traverse, so that gear wheel 56 in the calculator apparatus 200 will be moved into register with and rotated by five teeth of the actuating cylinder 58. The circuit for the energization of the electromagnetic device 205 in the sixth ordinal position may be traced as follows: Source of current supply 128, conductor 129, conducting bar 283, wiper contact 380, segmental contact 288, conductor 327, rectifier 328, conductor 329, winding of electromagnetic device 205 in the sixth ordinal position, conductor 133, contacts 199, 159 and movable contact 160 of switch 105, conductor 124 to ground.

Printing of the numeral "6" by the typewriter 100 will result in the closing of switch 106 in the typewriter 100. Closing of switch 106 will complete circuits for the simultaneous operation of an electromagnetic device 204, and an electromagnetic device 206, the latter of which will operate to release a selecting slide 54 for downward movement, the extent of downward movement being controlled, in this case, by the bolt 227 in an electromagnetic device 204. Assuming that the value "6" has been typed by the typewriter for entering in the fifth ordinal position of the calculator, the circuits for operation of the electromagnetic devices 204 and 206 may be traced as follows: For the electromagnetic device 204, source of current supply 128, conductor 129, conducting bar 283, wiper contact 380, segmental contact 289, conductor 331, rectifier 329, conductor 330, winding of electromagnetic device 204 in the fifth ordinal position, conductor 136, conductor 161, contact 162 and movable contact 163 of switch 106, conductor 124 to ground. For the energization of the electromagnetic device 206, source of current supply 128, conductor 129, conducting bar 283, wiper contact 380, segmental contact 289, conductor 331, rectifier 332, conductor 333, winding of electromagnetic device 206 in the fifth ordinal position, conductor 165, conductor 334, contacts 168, 162, and movable contact 163 of switch 106, conductor 124 to ground.

Printing of a numeral "7" by the typewriter will result in the energization of electromagnetic devices 203 and 206 to condition the calculating apparatus 200 for the entering of the value "7" therein. Assuming that the value "7" is entered in the fourth ordinal position the circuits for the operation of the electromagnetic devices 203 and 206 may be traced as follows: For the electromagnetic device 203, source of current supply 128, conductor 129, conducting bar 283, wiper contact 380, segmental contact 290, conductor 335, rectifier 336, conductor 337, winding of electromagnetic device 203 in the fourth ordinal position, conductor 139, conductor 140, conductor 169, contact 170 and movable contact 171 of switch 107, conductor 124 to ground. The circuit for the operation of the electromagnetic device 206 in the fourth ordinal position may be traced as follows: Source of current supply 128, conductor 129, conducting bar 283, wiper contact 380, segmental contact 290, conductor 335, rectifier 338, conductor 339, winding of electromagnetic device 206 in the fourth ordinal position, conductor 165, conductor 334, contacts 175, 170 and movable contact 171 of switch 107, conductor 124 to ground.

The printing of the figure "8" in the typewriter and the consequent closing of the switch 108 will result in the placing of the value of the digit "8" in the calculating machine 200 by operation of the electromagnetic devices 202 and 206, assuming that entry should be made in the third ordinal position in the calculator the circuits for the energization of the electromagnets 202 and 206 may be traced as follows: For the electromagnet 202, source of current supply 128, conductor 129, conducting bar 283, wiper contact 380, segmental contact 291, conductor 340, rectifier 341, conductor 342, winding of electromagnetic device 202 in the third ordinal position, conductor 150, conductor 176, contact 177, and movable contact 178 of switch 108, conductor 124 to ground. For the electromagnetic device 206, source of current supply 128, conductor 129, conducting bar 283, wiper contact 380, segmental contact 291, conductor 340, rectifier 344, conductor 345, winding of electromagnetic device 206 in the third ordinal position, conductor 165, conductor 334, contacts 180, 177, and movable contact 178 of switch 108, conductor 124 to ground.

Operation of the key "9" in the typewriter 100 and the consequent operation of the switch 109 in the typewriter will result in the energization of electromagnetic devices 201 and 206 in the calculator 200. The circuit for the electromagnetic device 201 and assuming that the entry would be made in the second ordinal position would be as follows: Source of current supply 128, conductor 129, conducting bar 283, wiper contact 380, segmental contact 292, conductor 346, rectifier 347, conductor 348, winding of electromagnetic device 201 in the second ordinal position, conductor 157, conductor 181, contact 182, and movable contact 183 of switch 109, conductor 124 to ground. For the energization of the electromagnetic device 206 in the second ordinal position, the circuit would be as follows: Source of current supply 128, conductor 129, conducting bar 283, wiper contact 380, segmental contact 292, conductor 346, rectifier 350, conductor 351, winding of electromagnetic device 206 in the second ordinal position, conductor 165, conductor 334, contacts 184, 182, and movable contact 183 of switch 109, conductor 124 to ground.

It will be seen that by suitable operation of the tabulating facilities of the typewriter and the movement of the carriage and the subsequent and selective operation of the electromagnetic devices in the calculator 200, the values of digits "1" to "9," inclusive, may be entered in the calculator 200, at any required ordinal position of the calculator, and that the amounts entered in the calculator 200 will be accumulated in the usual accumulating apparatus provided in the calculator 200, and comprising the numeral wheels 17 in the various ordinal positions in the carriage. As above mentioned, the numeral wheels 17 in the calculator are provided with selecting switches 300, each comprising a wiper contact and a set of fixed contacts over which the wiper contact 301 is moved as the numeral wheel 17 rotates. Since the selector switches 300 are operated in accordance with the rotations of the numeral wheels 17 in the calculator, and in effect keep pace with the rotations of the numeral wheels, the selector switches 300 prepare circuit conditions in an electrical readout system 352, shown in Fig. 9, through which the amounts recorded on the numeral wheels 17 in the calculator 200 may be read out and transmitted back into the typewriter apparatus to control the typewriter apparatus in such manner that it will typewrite the amounts represented on the numeral wheels 17 in the calculator 200.

*Operation of the readout apparatus*

As shown in Fig. 9, which represents a readout arrangement for two ordinal positions in the calculator, a selector type switch 300 is provided for the first ordinal position and a selector type switch 353 is provided for the second ordinal position. In Fig. 9, the wiper contact 301 of the selector switch 300 is in engagement with the #2 fixed contact in the set of fixed contacts 304. This indicates that the value "2" has been entered in the calculator 200 in the first ordinal position. In the second ordinal position which is represented in Fig. 9 by the selector type switch 353, the wiper contact 354 is resting on the #4 fixed contact in the set of fixed contacts 355 provided in the switch 353 for the second ordinal position. The position of the wiper contact 354 indicates that the value "4" has been entered in the calculator in the second ordinal position. The switches 300 and 353 are carried in the carriage of the calculating apparatus 200.

The switches 300 and 353 travel back and forth with the movements of the carriage and move relative to a relatively fixed conducting button 356 which is supported on a leaf spring 311, mounted on a stationary part of the calculator. The leaf spring is in electrical connection with the source of current supply 128 by way of a conductor 357. The wiper contact 301 in the switch 300 is connected by means of a leaf-spring contact 306 to a relatively large headed conducting screw 309 which, as shown in Fig. 4, is supported on an insulating strip 308. As the carriage 16 moves along past the position or to the position of the leaf-spring contact 311, the conducting button 356 makes contact with the conducting screw 309. At this time current is supplied over the electrical readout system to the key-operating solenoids 360 provided in the typewriter 100. In this case since the wiper contact 301 is resting on the fixed contact #2 in the switch 300, the solenoid 362, which controls the #2 key in the typewriter 100, will be energized to print the numeral "2" on a record sheet in the typewriter 100. The current supply for operation of the solenoid 362 in this case may be traced as follows: Source of current supply 128, conductor 357, leaf-spring contact 311, conducting button 356, conducting screw 309, leaf-spring contact 306, wiper contact 301, fixed contact #2 in switch 300, conductor 372 in Fig. 9, conductor 372 in Fig. 7, winding of solenoid 362, conductor 381 to ground. Energization of solenoid 362 will cause the typewriter 100 to print the character "2."

When the carriage 16 brings the selector type switch 353 into position for its value to be read into the typewriter 100, the conducting button 356 is in engagement with the conducting screw 382 which corresponds to the conducting screw 309 in the switch 300. Engagement of the conducting button 356 with the conducting screw 382 will cause energization of a solenoid in the set of solenoids 360 in the typewriter 100, and in this particular case the solenoid in the set 360 will be the solenoid 364 since the wiper contact 354 in the switch 353 is resting on the #4 fixed contact in the set of fixed contacts 355 in the switch 353. The circuit for the energization of the solenoid 364 in the typewriter 100 may be traced as follows: Source of current supply 128, conductor 357, leaf-spring contact 311, conducting button 356, conducting screw 382, conductor 383, wiper contact 354, #4 fixed contact in the set of fixed contacts 355, conductor 384, conductor 385 in Fig. 9, conductor 385 in Fig. 7, winding of solenoid 364, conductor 381 to ground. Operation of the solenoid 364 in the typewriter 100 will result in the typewriter operating to print the figure "4" in the space required, which in this case would be in the next space from that occupied by the character "2." It will be readily seen by looking at the circuits shown in Figs. 7 and 9, that the solenoids 361 to 370 may be separately operated under control of the readout switches 300 and 353, as required to control the typewriter 100, in typewriting the amounts accumulated in the accumulator in the calculator 200 involving the numeral wheels 17. For example, if the wiper contact 301 of the switch 300 were on the contact "0" at the time the reading out of the switch representations occurred, the solenoid 370 in the set of solenoids 360 in the typewriter 100 would be operated over a circuit as follows: Source of current supply 128, conductor 357, leaf-spring contact 311, conducting button 356, conducting screw 309, leaf-spring contact 306, wiper contact 301, number "0" contact in the set of fixed contacts 304 in the switch 300, conductor 386, conductor 387 in Fig. 9, conductor 387 in Fig. 7, winding of solenoid 370 in the set of solenoids 360 in the typewriter 100, conductor 381 to ground. If the wiper contact 354 in the switch 353 were on the #8 contact when reading out of the switch occurred, the circuit for energization of the solenoid 368 in the typewriter 100 would be as follows: Source of current supply 128, conductor 357, leaf-spring contact 311, conducting button 356, conducting screw 382, conductor 383 which corresponds to the leaf-spring contact 306 shown in Fig. 4, wiper contact 354 in switch 353, #8 fixed contact in set of fixed contacts 355, conductor 388 in Fig. 9, conductor 388 in Fig. 7, winding of solenoid 368, conductor 381 to ground. Although only two selector switches, 300 and 353, are shown in the drawing, it will be understood that there may be provided any number of switches of this type to enable reading out of the values of all the numeral wheels 17 provided in the calculator apparatus 200. For example, there may be a selector switch for each numeral wheel in each ordinal position.

All of the invention is herein illustrated and described as being a selecting means suitable for use in connection with a calculating apparatus. It will be readily recognized, however, that the selecting apparatus involved is not limited to such use since the electromagnetic devices 201 to 206, inclusive, could readily be used, not only for controlling the operation of selecting slides in a calculator, but are suitable for use as controlling means of other movable elements provided with apertures or openings in which the electromagnetically controlled bolt members 227 could be entered to serve as stops for the movable members required to be controlled.

What is claimed is:

1. In a calculating apparatus comprising a pair of selecting slides, arranged in parallel relation and each slide separately operable to control the application of power means to registering members, to enter different values in the calculator, a plurality of electromagnetic devices selectively operable to control the operation of said pair of selecting slides, spring-operated bolt members in said electromagnetic devices, a plurality of rectangular apertures formed in upper edge portions of each of said selecting slides at spaced points and of different length dimensions, the apertures in the edge portions of the selecting slides in a pair being alike in number and form and arranged to accommodate said bolt members, each of said bolt members extending across a pair of said selecting slides, pivotally supported armature means extending into latching engagement with said bolt members and normally operating to hold said bolt members withdrawn from said apertures, latch means supported on said selecting slides, latch plates engageable by said latch means, electromagnetic devices to release said latch means from engagement with said latch plates and remote control means for said electromagnetic devices and comprising a set of key controlled switches through the operation of which a selecting slide may be released to move, and a bolt member may be released to project into an aperture in the selecting slide to stop movement of the selecting slide when a wall defining the aperture in the selecting slide comes into contact with the released bolt member, the length of the aperture in the upper edge of the selecting slide and the relative position of the released bolt member determining the extent of movement of the selecting slide.

2. In a calculating apparatus comprising a pair of selecting slides operable to control the application of a power means to accumulating registers and means to operate said selecting slides, a plurality of apertures formed in edge portions of said selecting slides, the apertures in each selecting slide being in paired relation with the apertures in the other of said selecting slides, each aperture in a selecting slide being different in length dimension from other of said apertures in the same selecting slide, latch means operating to normally hold said selecting slides against movement, an electromagnetic device for each selecting slide and selectively operable to release the latch means of said selecting slide and a set of electromagnetic devices common to the selecting slides of said pair and operable to selectively control the extent of movement of said selecting slides when said latch means are released, each of said selecting slides being selectively controllable to move to a required position by operation of said latch means and one of the electromagnetic devices standing as common to the selecting slides of a pair.

3. In a printing calculator apparatus comprising, in combination, a key controllable typewriter, a calculator apparatus, selector slides in said calculator apparatus and an electrical system operating as a means of connection between the typewriter and the calculator apparatus, an electromagnetic device comprising an apertured frame, post members supported on and extending from one face of said frame, a spring-urged slidable apertured bolt member supported on said post members on one face of said frame, a tang projecting from said bolt member, an L-shaped armature extending through and pivotally supported in said frame, a latch finger extending from said armature and in parallel relation with said bolt member and into hooked latching engagement with said bolt member, an apertured flange on said frame, a post mounted in said apertured flange and extending in parallel spaced relation with the body portion of said frame, an energizing coil supported on said post on said frame and operable to tilt said armature to release said latch finger from latching engagement with said bolt member, and a pivotally supported bellcrank lever extending through said frame and said bolt member and into engagement with said tang and operable to restore said bolt member to normal position, the energizing coils of said electromagnetic device being under the control of said typewriter and being operable to release said latch fingers from holding engagement with said bolt members.

4. In a printing calculator apparatus comprising, in combination, a key controlled typewriter, a calculator having selector slides and an electrical system operating as a means of communication between said typewriter and said calculator, an electromagnetic device comprising an apertured frame, a plurality of spring-urged apertured bolt members supported on one side of said frame, shoulders on said bolt members, a plurality of L-shaped armatures extending through and pivotally supported in the apertures in said frame, hook members extending from said armatures and down one side of said frame and into latching engagement with said shoulders on said bolt members, projecting tangs on said bolt members, energizing coils for said armatures, supports for said coils extending into and supported by said frame, a set of bellcrank restoring levers for said bolt members extending through said frame and said bolt members and into engagement with said projecting tangs on said bolt members and a rod extending along and supported by said frame and serving as a common support for said bellcrank restoring levers, a restoring drive means, said restoring drive means cooperating with said restoring bellcrank levers to drive said restoring bellcrank levers so as to restore said bolt members, the energizing coils of said electromagnetic device being under the control of said typewriter and being operable to release said hook members from latching engagement with said bolt members.

5. In a calculating machine, a selecting apparatus comprising a pair of selecting slides arranged in parallel spaced relation and operable for entering numerical values of "1" to "9" inclusive in said calculating machine, one of the selecting slides of the pair being operable for entering numerical values of "1" to "4" inclusive and the other selecting slide being operable for entering numerical values of "6" to "9" inclusive, means to move said selecting slides, means to selectively and differentially control the movement of said selecting slides, a series of apertures formed in upper edge portions of said selecting slides at spaced intervals and of different length dimensions, the apertures in each selecting slide being equal to and corresponding with the apertures in the other selecting slide of the pair, a plurality of electromagnetic devices operable to control the operation of said selecting slides, bolt members in said electromagnetic devices operable to move relative to said selecting slides, some of said bolt members being formed to extend across the pair of selecting slides and being operable to move into series of apertures formed in the upper edge portions of said selecting slides to limit the lengthwise movement of said selecting slides, latch finger portions in said electromagnetic devices, said latch finger portions normally extending into latching engagement with said bolt members to normally prevent said bolt members from moving into the apertures in the upper edge portions of said selecting slides, a latch member individual to and pivotally supported on each selecting slide, a fixed latch plate normally engaged by said latch members and bolt members on two of said electromagnetic devices, being operable to move said latch members from engagement with said latch plate to permit said selecting slides to move lengthwise to the extent permitted by the associated electromagnetic devices controlling the movement of the bolt members into the apertures provided in the upper edge portions of the selecting slides, each selecting slide being controlled in its movement by the releasing of the latch on the selecting slide and the releasing of a bolt member common to the selecting slides of a pair and to extend into the path of movement of the apertured portions of the selecting slides, the length of movement of said selecting slides being different for different numerical values and being in accordance with the length of one of the apertures provided in the upper edge of the selecting slide and the relative positioning of the bolt member released to extend into the aperture.

6. In a calculating apparatus comprising an apertured selector slide operable in the storing of numerical values in the calculator, a slide bolt movable to extend into an aperture in said selector slide to limit the extent of movement of said selector slide, spring means normally urging said slide bolt in one direction, an electromagnetic device, an L-shaped armature in said electromagnetic device, a hook member controlled by said armature and normally in hooked holding engagement with said slide bolt and operating to latch said slide bolt against movement by its spring, means to energize said electromagnetic device to release said hook member from latching engagement with said slide bolt and means to move said slide bolt against the action of its spring to restore said slide bolt to its normally latched condition.

7. A selecting apparatus comprising a plurality of separately operable selecting slides arranged in pairs and in parallel relation, means to urge said slides in one direction, a plurality of apertures of different dimensions in the upper edge of each selecting slide, the size of each aperture being predetermined in accordance with a length of movement required for the selecting slide, the apertures in each selecting slide of a pair being in matched relation with the apertures in the other selecting slide of the pair, a plurality of bolts in register with said apertures and operable to extend into the apertures in said selecting slides to serve as stops against which end walls of the apertures will impinge to control the extent of movement of said selecting slides, each bolt extending across two selecting slides, spring means urging said bolts to enter apertures in said selecting slides, armature means with hook portions to normally hold said bolts against movement into the apertures in said selecting slides, electromagnetic means to operate said armature means and the hook portion thereof to a released position, a latch finger pivotally supported on each selecting slide, a latch plate engageable by the latch finger, an electromagnetic means operable to release said latch finger and means to selectively and differentially control the operation of said electromagnetic means to selectively and differentially control the operation of said selecting slides.

8. A selecting apparatus comprising a pair of movable selecting slides, upper edge portions in said selecting slides, means to move said selecting slides, each of the selecting slides in said pair being separately operable for different groups of numerical values, a plurality of rectangular apertures of different dimensions formed in said upper edge portions at spaced points along said selecting slides, a plurality of spring-urged bolt members operable to be made to extend into the apertures formed in said selecting slides to control the movement of said selecting slides, each bolt member extending across its pair of selecting slides, latch members with hook portions thereon normally operating to hold said spring-operated bolt members against extending into the apertures in said selecting slides, latch means pivotally supported on each selecting slide to normally hold each selecting slide against operation, electromagnetic means to operate said latch members to release said bolt members, electromagnetic means to release said latch means and means to selectively operate said electromagnetic means to differentially control the operation of said selecting slides.

9. A selecting apparatus for entering values in a calculator comprising a plurality of pairs of selecting slides arranged in parallel spaced relation, each selecting slide being operable to control the application of a predetermined power means to registers in a calculator, a series of rectangular apertures formed in upper edge portions in said selecting slides at spaced intervals and of different dimensions, the apertures in each selecting slide of each pair being equal to and corresponding with the apertures in the other selecting slide of said pair, a plurality of electromagnetic devices operable to control the operation of said selecting slides, spring-operated bolt members in register with the apertures in said selecting slides and operable to be moved to extend into the like apertures formed in both of said selecting slides, each bolt member extending across a pair of said selecting slides, latch fingers carried by said selecting slides, a latch plate for and engageable by said latch fingers, electromagnetic means operable to release said latch fingers from engagement with said latch plate, a set of levers operable to move said bolt members away from said selecting slides, latch members to hold said bolt members from movement under the action of the springs and into the apertures in said selecting slides, a movable restoring bar apertured to accommodate said bolt members and end portions of said levers, a bail member operable to move said restoring bar to operate said set of levers, electromagnetic means to operate said bail member, each of said selecting slides being controlled to move to a required position for entering predetermined values in said calculator by operation of one of said electromagnetic devices to control the operation of said bolt means and by the operation of another of said electromagnetic devices to control the operation of one of said latch fingers and means to differentially control the operation of said electromagnetic devices.

10. In a calculating apparatus comprising a pair of selecting slides, arranged in side-by-side relation and each selecting slide separately operable to control the application of power means to accumulating registers to enter different numerical values in the calculators, a plurality of electromagnetic devices selectively operable to control the operation of said selecting slides, spring-operated members operable to extend into the path of movement of portions of said selecting slides, a plurality of rectangular apertures formed in an upper edge portion of each of said selecting slides at spaced points and of different length dimensions, the apertures in one selecting slide being the same in size and arrangement as the apertures in the other selecting slide of the pair and arranged to receive said spring-operated members, armatures in said electromagnetic devices extending into latching engagement with said spring-operated members and normally operating to restrain said spring-operated members from extending into said apertures in said selecting slides, said armatures being operable to release said spring-operated members upon energization of said electromagnetic devices, latch means individual to said selecting slides, electromagnetic devices to operate said latch means and differentially operable means to control the operation of said electromagnetic devices to operate said spring-operated members and said latch means for entering a predetermined numerical value in said calculating apparatus.

11. In a calculating apparatus comprising a pair of selecting slides, each selecting slide separately operable to control the application of power means to accumulating registers and means to move said selecting slides, a plurality of rectangular apertures formed in upper edge portions of said selecting slides and of different length dimensions, the apertures in each selecting slide being in paired relation with the apertures in the other of said selecting slides, a plurality of spring-operated members in register with and operable to extend into said apertures and into the path of movement of said selecting slides to selectively control the extent of movement of said selecting slides, each of said spring-operated members extending across a pair of said selecting slides, a plurality of electromagnetic devices, L-shaped armatures pivotally supported in said electromagnetic devices, hook portions on said armatures extending into engagement with said spring-operated members and normally operating to hold said spring-operated members from movement in the direction of said selecting slides, latch means individual to said selecting slides to normally hold said selecting slides against movement, electromagnetic means to release said latch means and means to selectively operate said electromagnetic devices to release said hook portions from said spring-operated members, each of said selecting slides being controllable to move to required positions for entering predetermined numerical values in said calculating apparatus by operation of one of said spring-operated members and one of said latch means, the extent of movement of each selecting slide being determined in each case by the length of the aperture in the selecting slide in register with the released spring-operated member and the relative spacing of the spring-operated member and an end wall of the aperture.

12. In a printing calculator apparatus comprising, in combination, a key controlled typewriter, a calculator and an electrical system operating as a means of communication between said typewriter and said calculator, a selecting apparatus comprising a pair of movable selecting slides arranged in parallel spaced relation, in said calculator, each selecting slide in said pair being separately movable, means to move said selecting slides, apertures formed in edge portions of said selecting slides at spaced intervals along said selecting slides, the apertures in a selecting slide being of different length dimensions, the spacing of the corresponding apertures in said selecting slides being the same in all respects, said apertures in each selecting slide being in paired relation with the apertures in the other selecting slide of said pair, latch means pivotally supported on said selecting slides, fixed plate means engageable by said latch means and cooperating therewith to normally hold said selecting slides against movement, a plurality of spring-urged apertured bolt members operable to move into the apertures in said selecting slides, latch members normally holding said bolt members retracted from the apertures in said selecting slides, a plurality of electromagnetic devices to selectively control the operation of said selecting slides by operating to release said latch means and said latch members, key controlled switch means for differentially and selectively controlling the operation of said electromagnetic devices, a bail member common to said selecting slides to restore said selecting slides to normal latched position, electromagnetic means to operate said bail member and adjustment screw members adjustably supported in said bail member and operable to be adjusted to engage said selecting slides when said bail member is operated.

References Cited in the file of this patent

UNITED STATES PATENTS

| Number | Name | Date |
|---|---|---|
| 1,098,095 | Carroll | May 26, 1914 |
| 1,262,727 | Williams | Apr. 16, 1918 |
| 1,916,611 | Friden | July 4, 1933 |
| 2,234,652 | Prager | Mar. 11, 1941 |
| 2,293,127 | Fishack et al. | Aug. 18, 1942 |
| 2,333,370 | Graham | Nov. 2, 1943 |
| 2,609,704 | Anderson | Sept. 9, 1952 |
| 2,642,226 | Luhn | June 16, 1953 |
| 2,675,175 | Frieberg | Apr. 13, 1954 |
| 2,714,989 | Ellerbeck | Aug. 9, 1955 |
| 2,741,427 | Drake | Apr. 10, 1956 |
| 2,756,933 | Gang | July 31, 1956 |